US008126870B2

(12) United States Patent
Chowdhuri et al.

(10) Patent No.: US 8,126,870 B2
(45) Date of Patent: Feb. 28, 2012

(54) SYSTEM AND METHODOLOGY FOR PARALLEL QUERY OPTIMIZATION USING SEMANTIC-BASED PARTITIONING

(75) Inventors: Sudipto R. Chowdhuri, Dublin, CA (US); Mihnea Andrei, Issy les Moulineaux (FR)

(73) Assignee: Sybase, Inc., Dublin, CA (US)

( * ) Notice: Subject to any disclaimer, the term of this patent is extended or adjusted under 35 U.S.C. 154(b) by 1212 days.

(21) Appl. No.: 10/908,956

(22) Filed: Jun. 2, 2005

(65) Prior Publication Data
US 2006/0218123 A1 Sep. 28, 2006

Related U.S. Application Data

(60) Provisional application No. 60/594,310, filed on Mar. 28, 2005.

(51) Int. Cl.
G06F 17/30 (2006.01)
G06F 17/00 (2006.01)

(52) U.S. Cl. .................... 707/713; 707/636

(58) Field of Classification Search ............. 707/3, 2, 707/1, 100
See application file for complete search history.

(56) References Cited

U.S. PATENT DOCUMENTS

| | | | |
|---|---|---|---|
| 4,769,772 A * | 9/1988 | Dwyer | 707/2 |
| 4,870,568 A | 9/1989 | Kahle et al. | |
| 5,412,804 A | 5/1995 | Krishna | |
| 5,574,900 A * | 11/1996 | Huang et al. | 707/1 |
| 5,590,319 A | 12/1996 | Cohen et al. | |
| 5,692,174 A | 11/1997 | Bireley et al. | |
| 5,806,059 A | 9/1998 | Tsuchida et al. | |
| 5,884,303 A | 3/1999 | Brown | |
| 5,926,809 A | 7/1999 | Szalwinski | |
| 5,940,289 A | 8/1999 | Iwata et al. | |
| 6,009,265 A * | 12/1999 | Huang et al. | 707/3 |
| 6,026,394 A | 2/2000 | Tsuchida et al. | |
| 6,067,542 A | 5/2000 | Carino | |
| 6,101,495 A | 8/2000 | Tsuchida et al. | |
| 6,108,647 A | 8/2000 | Poosala et al. | |
| 6,112,198 A * | 8/2000 | Lohman et al. | 707/3 |
| 6,192,359 B1 | 2/2001 | Tsuchida et al. | |
| 6,263,328 B1 | 7/2001 | Coden et al. | |
| 6,289,334 B1 | 9/2001 | Reiner et al. | |
| 6,507,834 B1 * | 1/2003 | Kabra et al. | 707/2 |
| 6,510,428 B2 | 1/2003 | Tsuchida et al. | |
| 6,564,205 B2 | 5/2003 | Iwata et al. | |

(Continued)

OTHER PUBLICATIONS

An Introduction to Database Systems (Ch 1-4), 7th Ed., Addison Wesley, 2000.

(Continued)

*Primary Examiner* — Tarek Chbouki
(74) *Attorney, Agent, or Firm* — Sterne, Kessler, Goldstein & Fox P.L.L.C.

(57) ABSTRACT

A system and methodology for parallel query optimization using semantic-based partitioning is described. In one embodiment, for example, in a database system comprising a database storing data in database tables, a method is described for improving query performance by dynamically partitioning the data, the method comprises steps of: receiving a query requesting data from the database; generating a plurality of subplans for executing the query, each subplan including one or more operators for performing relational operations; adding operators for partitioning data and performing a given relational operation in parallel to at least some of the plurality of subplans; and building a plan for execution of the query based, at least in part, upon selecting subplans having favorable execution costs.

46 Claims, 21 Drawing Sheets

U.S. PATENT DOCUMENTS

| | | | |
|---|---|---|---|
| 6,594,651 B2 * | 7/2003 | Kabra et al. | 707/2 |
| 6,625,593 B1 | 9/2003 | Leung et al. | |
| 6,691,101 B2 | 2/2004 | MacNicol et al. | |
| 6,732,084 B1 | 5/2004 | Kabra et al. | |
| 6,738,756 B1 | 5/2004 | Brown et al. | |
| 6,754,652 B2 * | 6/2004 | Bestgen et al. | 707/3 |
| 6,757,670 B1 | 6/2004 | Inohara et al. | |
| 6,910,032 B2 | 6/2005 | Carlson et al. | |
| 7,051,034 B1 * | 5/2006 | Ghosh et al. | 707/100 |
| 7,155,428 B1 | 12/2006 | Brown et al. | |
| RE42,664 E * | 8/2011 | Hallmark et al. | 707/636 |
| 2002/0198872 A1 | 12/2002 | MacNicol et al. | |
| 2003/0014393 A1 | 1/2003 | Kabra et al. | |
| 2003/0187831 A1 | 10/2003 | Bestgen et al. | |
| 2005/0131879 A1 | 6/2005 | Ghosh et al. | |
| 2005/0131881 A1 | 6/2005 | Ghosh et al. | |
| 2008/0263001 A1 * | 10/2008 | Lohman et al. | 707/2 |

OTHER PUBLICATIONS

Information Technology—Database languages—SQL, American National Standard ANSI/ISO/IEC 9075: 1992.

Information Technology—Database languages—SQL (Ch 4), American National Standard ANSI/ISO/IEC 9075: 1992.

* cited by examiner

SYSTEM AND METHODOLOGY FOR PARALLEL QUERY OPTIMIZATION USING SEMANTIC-BASED PARTITIONING

CROSS REFERENCE TO RELATED APPLICATIONS

The present application is related to and claims the benefit of priority of the following commonly-owned provisional application(s): application Ser. No. 60/594,310, filed Mar. 28, 2005, entitled "System and Methodology for Parallel Query Optimization Using Semantic-Based Partitioning", of which the present application is a non-provisional application thereof. The present application is related to the following commonly-owned, presently-pending application(s): application Ser. No. 10/711,931, filed Oct. 13, 2004, entitled "Database System with Methodology for Parallel Schedule Generation in a Query Optimizer". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 87487 Bytes, created: Jun. 1, 2005 5:57:28 PM; Object ID: File No. 1; Object Contents: Source code.

BACKGROUND OF INVENTION

1. Field of the Invention

The present invention relates generally to data processing environments and, more particularly, to a system and methodology for parallel query optimization using semantic-based partitioning.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives.

Relational database queries are broadly classified into simple transactional queries found in online transaction processing (OLTP) environments, and complex queries found in operational decision support system (DSS) environments. Although existing database systems are in wide use in DSS applications and in OLTP applications, there is a growing user demand for supporting both types of queries in a single system. Users need a solution capable of handling complex queries and also having the ability to process large data sets for both local and distributed systems. They are looking for a robust database server system platform for running mixed workload applications that demand superior performance for queries from both OLTP and DSS domains, sometimes across distributed and heterogeneous database servers. This environment is referred to as an operational decision support system (operational DSS), since it allows running complex queries as well as performing regular OLTP processing.

Users are also looking for the applications to provide improved performance. A problem in current database systems is that as the quantities of data managed by a database system grows, the efficiency of relational operations (e.g., SQL queries) against the data maintained in the database decreases. The efficiency of relational operations, and in particular each of the various SQL operators (e.g., joins, unions, and the like) that are used in executing database queries in modern database systems, starts deteriorating at a rate that is almost exponential to the quantity of data that must be handled by the SQL operator. Strategies that can be used to improve query performance involve reducing the total amount of work that needs to be done in executing a query and/or by dividing the work that needs to be done in executing the query among multiple processors. In order to effectively divide the work to be done among multiple processors, what is needed is an effective technique for partitioning the data to be operated on during the processing of the query into smaller fragments so that operations on those fragments can be performed concurrently.

Unfortunately, existing partitioning strategies have a number of limitations. Current solutions only work for a small subset of SQL operations. Existing partitioning solutions may be able to take advantage of the partitioning (e.g., range partitioning) of a data table. For example, assume that a customer table is range partitioned on a customer id column, with customer ids<=1000 in P1 (partition one), 1001-2000 in P2, 2001-3000 in P3, and so forth. With certain simple queries, such as a query requesting the data rows where customer id is greater than 2000 (e.g., SELECT * FROM customers WHERE customer.id>2000), existing solutions can eliminate P1 and P2. However, existing solutions do not provide capabilities for handling more complex operations such as joins, unions, distinctness, and so forth. Existing partitioning techniques do not provide a generalized solution applicable to all database operations, including complex SQL operations such as grouping, joins, distinct operations, unions, and the like. In addition, current solutions rely to a large extent on partitioning of the underlying data. A better solution that does not require partitioning of the underlying data is needed.

The ability to execute portions of a query in parallel provides increased efficiency and performance by dividing query operations into subtasks which can then be executed across multiple resources like CPUs or disks simultaneously. However, to provide for more efficient parallel query processing, what is needed is a solution that provides the ability to efficiently partition data so that multiple subtasks or operations can be performed simultaneously. The solution should be generalized so that it is suitable for use in conjunction with database queries involving complex operations such as grouping, joins, unions, and distinctness. Ideally, the solution should also provide for partitioning data dynamically during the process of executing a query, without requiring partitioning of the database tables. The present invention provides a solution for these and other needs.

SUMMARY OF INVENTION

A system and methodology for parallel query optimization using semantic-based partitioning is described. In one embodiment, for example, in a database system comprising a database storing data in database tables, a method of the present invention is described for improving query performance by dynamically partitioning the data, the method comprises steps of: receiving a query requesting data from the database; generating a plurality of subplans for executing the query, each subplan including one or more operators for performing relational operations; adding operators for partitioning data and performing a given relational operation in parallel to at least some of the plurality of subplans; and building a plan for execution of the query based, at least in part, upon selecting subplans having favorable execution costs.

In another embodiment, for example, in a database system, a method of the present invention is described for optimization of a query requesting data from a database, the method comprises steps of: constructing a tree of relational operators based on the query, each relational operator for performing a given relational operation; determining whether dividing data processed by a particular relational operator in the tree is useful for executing a relational operation in parallel; if partitioning of a particular relational operator is determined to be useful, creating a revised tree by adding operators to the tree for dividing data processed by the particular relational operator and executing the particular relational operator in parallel over the divided data; and generating a plan for execution of the query based on the revised tree.

In yet another embodiment, for example, a database system of the present invention for dynamically partitioning data during query processing is described that comprises: a module for generating a plurality of plan fragments for obtaining data requested by a query from database tables of the database system; a partitioning module for creating additional plan fragments by adding operators for dynamically partitioning data and processing the partitioned data in parallel to at least some of the plan fragments; and a module for constructing a final plan for execution of the query based, at least in part, upon selecting plan fragments having operators for dynamically partitioning data and processing the partitioned data in parallel when dynamically partitioning data is determined to be advantageous.

In another embodiment, for example, in a database system comprises a database storing data in database tables, a method of the present invention is described for improving query performance comprising: receiving a query specifying a join of two or more database tables; as data is retrieved from the database during processing of the query, partitioning the data into separate memory buffers; and processing the query in parallel by concurrently processing the data in the memory buffers.

DETAILED DESCRIPTION

Glossary

Figure 1:
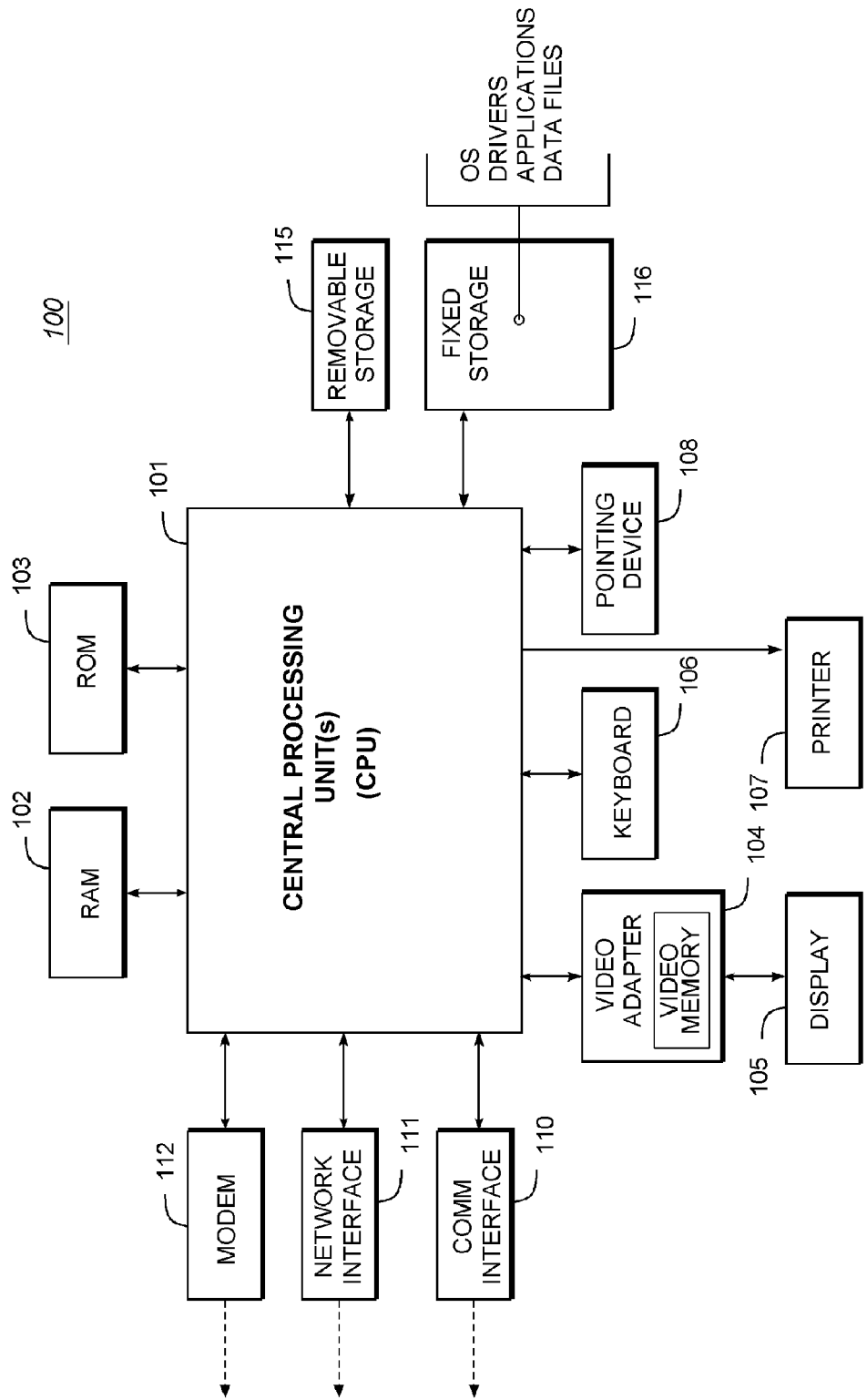
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Core optimizer: The core optimizer is a component of the present invention that generates a set of optimal query plans that are then analyzed to select the best plan (i.e., the plan having most favorable execution costs).

Cost based pruning: Cost based pruning is a type of pruning technique where portions of a search space (tree shapes, permutations, access methods) are skipped purely based on cost estimates applicable to a query.

Directed acyclic graph: A directed graph is a graph whose edges are ordered pairs of vertices (nodes). Each edge of a directed graph can be followed from one node (vertex) to the next. A directed acyclic graph is a directed graph where no path starts and ends at the same node.

Dynamic partition elimination: Dynamic partition elimination refers to methodology of the present invention for eliminating one or more partitions from the list of partitions to be scanned when the value of a parameter or a variable is determined at runtime. This methodology is also applicable for a column whose value becomes known for the inner scan of a nested loop join.

Enforcer: The enforcer nodes (operators) generate properties such as ordering, partitioning, and the like. At each node in a search graph all useful properties are made available either through eager enforcement by explicitly applying the enforcer or derived from child nodes. In prior database server systems properties were obtained by explicitly enforcing them, in some cases unnecessarily, when available as side-products of child operators.

Equi-partitioned: Refers to two tables having compatible partitioning keys and partitioning criteria. If two tables have the same number of partition keys with compatible data types, and the partition criteria such as the intervals are the same for the range partitions, the two tables are considered equi-partitioned.

Equivalence class: An equivalence class describes the set of subplans that combine a given subset of generic tables. The equivalence class also contains the logical properties of those subplans.

Execution engine operators: The execution module of the currently preferred embodiment of the present invention represents the query plan as a tree of operators (similar to the optimizer's physical plan-tree). These operators are referred to herein as execution engine operators or Lava engine operators (LeOp).

Existence scan: An existence scan is based on stopping the scan of an existence table as soon as a tuple was fully qualified at the top level, when each existence table is placed only after all non-existence tables correlated to it. It is typically introduced by tables from a flattened EXISTS subquery.

Expression partitioning: A partition condition specified by an expression involving attributes of a table that evaluates much like the SQL case statement to reference a specific partition.

Functional index: An index in which the index key contains functions on the attributes of the table. The index key could be an expression instead of a column list.

Generic Column: The term generic column normally refers to a column of a table referenced in a query, but may also refer to an abstraction that includes interesting expressions (e.g., those that can be used in an expression join).

Generic table: A generic table normally refers to a table referenced in a query, but also is a convenient abstraction to represent any object that is permutated in the join order by the optimizer. For example, a subquery can be modeled as a generic table.

Global index: Global indexes refer to indexes on partitioned tables. A global index results when an index and the table have different partitioning strategies such that the index leaf pages of the global indexes point to more than one partition.

Hash: A hash (or hash value) is a smaller data type (e.g., number) that represents another, larger, data type (usually a string). A hash is typically a number that is generated from a string of text by a hashing function. The hash is substantially smaller than the text itself, and is generated in such a way that it is unlikely that some other text will produce the same hash value. Hashes play a role in security systems (e.g., to ensure that transmitted messages or files have not been tampered with). Hashing is also a method for facilitating access to data records. Consider, for example, a list of names: John Smith, Sarah Jones, and Roger Adams. To create an index, called a hash table, for these records, one would apply a hashing function to each name to produce a unique numeric value such as the following: 1345873 John Smith, 3097905 Sarah Jones, 4060964 Roger Adams. To search for the record containing the name Sarah Jones, one just needs to reapply the hashing function, which directly yields the index key to the record. This is much more efficient than searching through all the records until the matching record is found.

Hash based aggregation: A strategy for evaluating "GROUP BY" aggregates in which the group is looked up by a hash key on the grouping columns.

Hash partitioning: The partition to which a row belongs is selected by using a hash function on the partitioning attributes of the row.

Hybrid Search Strategy: A type of search strategy in which permutations are generated in a top-down fashion while tree shapes, properties and costs are propagated in a bottom-up fashion.

Iterator: In the currently preferred embodiment of the present invention, query results are encapsulated using iterators, which are self-contained software objects that accept a stream of rows from null or n-ary data sets. The role of an iterator is to process many iterations of a data set across many nodes in serial or parallel. For each iteration of a data set, the iterator applies a predefined behavior to the data set being processed, manipulating the data according to the specification of that iterator. For example, scanning rows from a table on disk can be the behavior of one type of iterator. A key feature of iterators is that regardless of what type the iterator is and what behavior is associated with it, all iterators follow the same mode and have the same external interface. They all open data streams, iteratively read the streams, process it and close the streams.

Local indexes: When a table's index is partitioned the same way as its data, then such an index is called a local index.

Local server: The server/node where a given query originates.

Logical operator: A logical operator (LOP) is a relational algebra operator that is not associated or tied to a specific algorithm or implementation. "Scan" and "join" are examples of logical operators.

Logical partitioning: Logical partitioning is a way to partition data into n units such that when a function f is applied to the keys of a given tuple t, it generates an ordinal number that maps to one and only one partition. In other words it is $0 <= f(t,n) <= n-1$. An exception to this is round robin partitioning where such mapping does not hold.

Logical property: A logical property is a property that is common to a set of subplans associated with a set of tables (equivalence class). An example would be the "row count" since no matter how the set of tables are joined the same row should exist after the same predicates are applied.

Mixed workload: Relational database queries are broadly classified into simple transactional queries found in online transaction processing (OLTP) environments, and complex queries found in operational decision support system (DSS) environments. In a production environment, database systems can be configured to run either transactional or complex queries at the same time or at different times. Installations that support both of the above are referred to as "mixed workload" systems. Since it is not always possible to predict the type of workload, it is desirable to support both OLTP and DSS queries in the same configuration of the data processing system to efficiently support workloads of all types.

Node: A node refers to a database server in a homogeneous network of database servers which are connected together (e.g., coupled through the use of a Component Integration Services feature or other middleware).

Operators: The query processing (QP) modules of the system of the present invention break down relational queries into relational operators. Relational operators are represented as nodes in the query plan trees. The query plans are transformed (e.g., into logical operators, physical operators, and execution engine operators) while passing through different query processing modules: prep (preprocessing) phase, core optimizer, code generator, and execution engine.

Ordered set: In an ordered set the order of the members of a set are defined (e.g., a specific order (b, a) in a set containing members a, b). Ordered and unordered sets are used to model physical properties such as ordering and partitioning.

Ordering: Refers to a specific sequence (ascending or descending) of attributes in a result set as would occur from an index scan or a sort.

Partition elimination: Given a query that has predicates on the partitioning keys, it is possible to find out which partitions qualify a given predicate. However, predicates that are currently useful for partition elimination must qualify as conjunctive or disjunctive predicates on a single table of the form: col relop (literal).

Partitioning key: A search condition that evaluates to partition specification. The set of columns participating in the key specification is known as the partitioning key.

Partitioned parallelism: The division of data into more than one physical partition so that each partition can be accessed in parallel and managed by a worker thread. The IO and CPU parallelism resulting from such configuration speed up the SQL queries proportional to the number of partitions.

Physical operator: A physical operator is an algorithm implementing a logical operator (e.g., table scan, sort-merge join, nested loop join, and so forth).

Physical property: A physical property (or POP) is a property that is associated with a physical operator and depends on the actual algorithm implemented by that operator and on the physical properties of its children (hence, recursively, on the physical operators in the subplan). For example, the ordering (from an index scan or sort) of the outer child is usually inherited after subsequent nested loop join operators are evaluated, but each of those nested loop join plans in an equivalence class has potentially different orderings depending on the underlying operators used in the subplan POP.

Plan cache: A plan cache stores useful partial plans (plan fragments or subplans) that may be necessary in future construction of complete plans.

Property model: The present invention introduces an optimizer property model designed to represent efficiently all combinatorics of orderings so that maximal use is made of any ordering available from an index scan or a sort node. Partitioning is another property that is modeled in the optimizer of the present invention.

Pruning: Is a technique of search space control in which only promising sub-plans are retained (i.e., the ones that could be part of the best total plan). The optimizer uses cost based pruning and heuristics based pruning.

Query execution plan or QEP: A query execution plan or QEP is a data structure that is interpreted by the relational database management system's execution module or engine. In the currently preferred embodiment of the present invention, a QEP is a tree of relational algorithms applied to input tuple streams. A (logical level) relational expression is composed of (logical level) relational operators; it is a tree of logical nodes. A QEP or plan is composed of physical level relational operators (or algorithms); it is a tree of physical nodes. These physical operators are nodes in a tree that have children. A tree of physical operators is a subplan or the full (final) plan. A plan is the full plan if it covers the total semantics of the query (i.e., if the result set of the root node of the plan tree delivers the result set of the query).

Range partitioning: In this table-partitioning scheme, a data set for one or more attributes is partitioned on the value range. Thus, every row is pinpointed to a given partition.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

Remote node: A remote node refers to a node/server in a homogeneous network of database servers which are connected together other than the local node. A heterogeneous server in the network is referred to as a remote server rather than a remote node.

Round robin partitioning: A scheme that is best suited for load balancing. The data set is distributed in a round robin fashion without any attention to where a data value ends up. There are no semantics associated with such a partitioning scheme (i.e., given a row of the data set, one cannot say with certainty as to which partition a given row would belong to).

Scalar: Scalar is a term for an SQL expression that produces a single value (i.e., not a set of values).

Search engine: The search engine refers to a component of the query optimizer of the present invention that generates and evaluates alternate execution plans. The search engine includes as three components: search criteria, search space, and search strategy. The search engine constitutes a major component of the core optimizer.

Search space: Search space refers to the exhaustive set of plans considered for selection by the search engine.

Semi-join: A semi-join is a valid relational version of the existence scan that does not rely on non-local information. Typically these are introduced by flattening of EXISTS/IN subqueries.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Stored table: A fully materialized table, stored tables are either of persistent base tables, transient worktables, or table value constructors.

Subplan or plan fragment: A subplan or plan fragment is a tree of physical operators that is a portion of a (full) query execution plan (as defined above) or a candidate to become a portion of a (full) query execution plan.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

Unordered set: A power set of the members in the set, typically associated with a sort node or repartition node in which the optimizer does not want to predetermine the exact order of the attributes. The unordered set includes all subsets with all combinations and all cardinalities (e.g., {(a), (b), (a,b), (b,a)}).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, such as Microsoft Windows 9x, Microsoft Windows NT, Microsoft Windows 2000, or Microsoft Windows XP (all available from Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
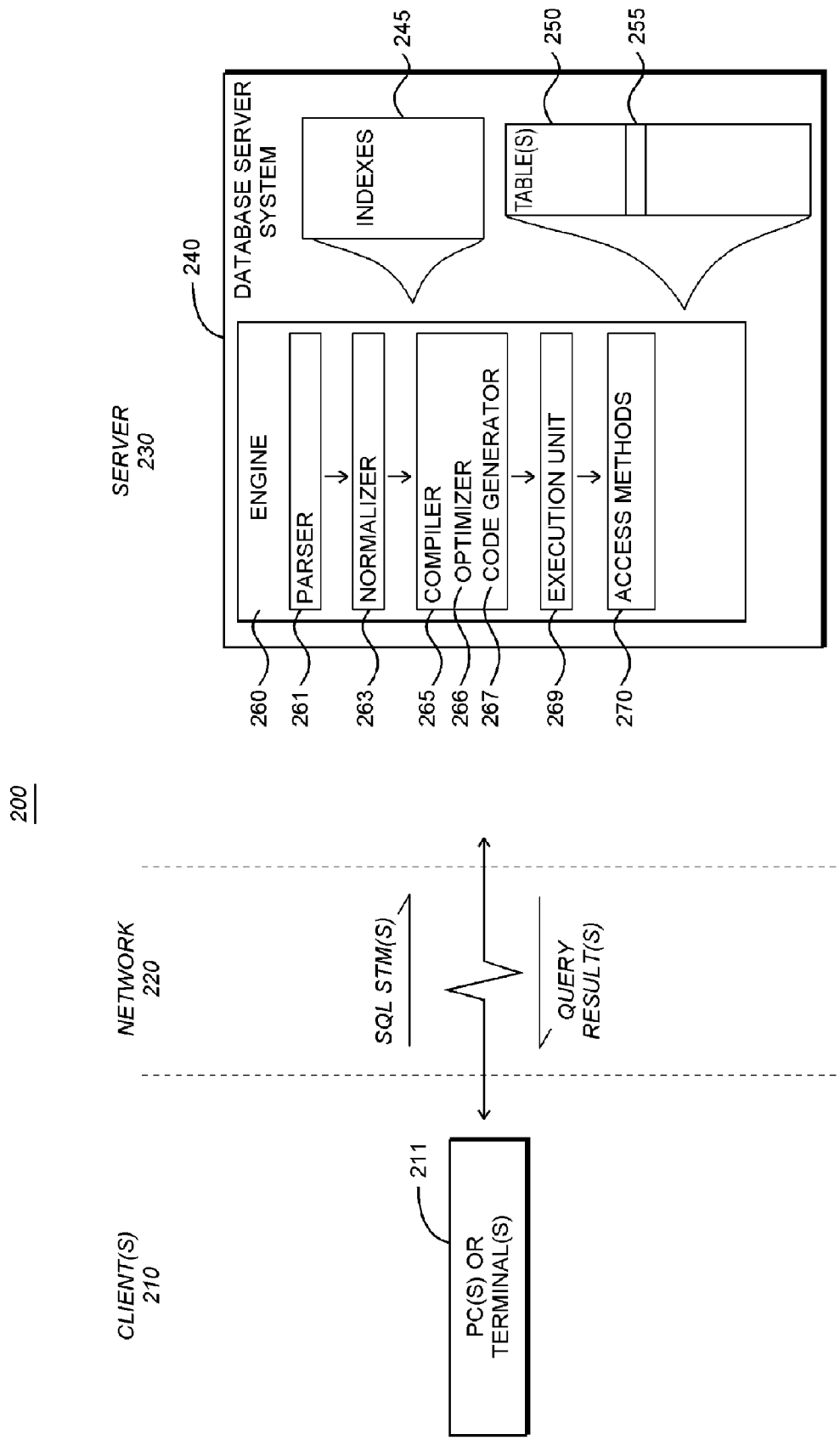
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Servers Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Servers Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists one or more "servers" (e.g., database servers) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

Introduction to Parallel Query Optimization Using Semantic-Based Partitioning

The present invention provides a divide and conquer technique for improving query performance, by partitioning data into smaller fragments and operating on those fragments concurrently (i.e., in parallel). The present invention provides a generalized approach which can be used for partitioning data and parallelizing the execution of a wide range of queries, thereby improving query processing performance. The present invention determines when it is advantageous to partition data and partitions data on-the-fly during query processing. In particular, the system of the present invention attempts, when possible, to partition the data so that the quantity of data provided to each relational operator in a query execution plan is within a range ("sweet zone") that that the relational operator can efficiently handle. For a query that must handle (process) a large quantity of data, this involves partitioning the data into a plurality of smaller fragments or streams and processing each of these fragments or streams in parallel by a separate worker thread. The results of the parallel operations on each of the fragments are then aggregated at appropriate points in the plan to emit the results of the query in the format expected by the client. Significantly, the data itself does not have to be partitioned. While system and methodology of the present invention works effectively with data that is already partitioned, partitioning of data (e.g., on disk) is not required for operation of the present invention. The present invention includes functionality for dynamically partitioning data (e.g., data derived from a single, unpartitioned table) during execution of a database query. Assume for example, that a data in a customer table on disk is unpartitioned. Once this data is read in (e.g., from disk), the system of the present invention can, in essence, split or partition the data dynamically so that operations may be performed on multiple data partitions in parallel.

While solving the problem of partitioning data in order to support parallel query processing, it was found that certain SQL operators have a very strong inclination or affinity to respond to sensitivity of data partitioning for a given attribute. SQL queries contain relational operators that can be classified as being "sensitive" or "attribute sensitive", which means that if such an operator were to be decomposed into multiple component operations of the same type, then the final result is merely an aggregation of the individual components. This can be expressed as follows: relop(operand)=relop(operand1) U relop(operand2) . . . relop(operandN), where a partitioning function "f" splits f(operand) into operand1, operand2, . . . operandN and "relop" refers to a particular relational operation. The system and methodology of the present invention provides for automatically splitting those relational operators that fall into this category into multiple parallel operators. Consider, for example, the following query requesting data from table A with data grouped on column A1:

SELECT COUNT (*), A1
  FROM A
  GROUP BY A1

If the data in table A had already been partitioned on column A1, then the same value of A1 would not be found in two different partitions. Given this type of data partitioning and a particular value of column A1, it can be determined that the row(s) having the particular value will only exist in one of the partitions. That means that one can, essentially, perform the SQL grouping operations on each of the partitions separately and then simply merge data in order to obtain the desired result. SQL operators of this nature are referred to as "attribute sensitive" operators. It should, however, be noted that only some SQL operators are "attribute sensitive". These include Group By, Distinct, Union, and Join operations, which typically comprise a majority of operations performed in executing most database queries. Generally, SQL operations which involve these notions of grouping, distinctness, and joining are candidates for partitioning and parallel processing. For example, for join operations, the present invention provides for marshaling the data so that it matches the join predicate. Similarly, for grouping operations, the data is marshaled based on the grouping column. The present invention also includes techniques for splitting relational operators that are not "sensitive" as hereinafter described. The system and methodology of the present invention provides for semantically partitioning the data on-the-fly during the search space inspection phase of query optimization for purposes of generating candidate parallel plans for execution of the query. Before describing the system and methodology of the present invention for parallel query optimization using semantic-based partitioning in greater detail, the parallel processing of a query will be introduced.

Vertical and Horizontal Parallelism

In a relational database system, a user query is broken down into a relational algebra that is comprised of algebraic operations. Each of these algebraic operations is thought to be a basic operator (i.e., an execution primitive). Depending upon the data-partitioning scheme, a query execution engine runs several instances of a given operator to work on different partitions, or allows operators to be executed in parallel. The ability to employ multiple resources like CPUs or disks simultaneously on more than one operator is termed vertical parallelism. Within each operator one can employ parallelism if the data set that it needs to look at has some disjoint property about it. In the present invention this is achieved through the use of data and index partitions. The ability to run multiple instances of the operators on different data sets located across different storage units is called horizontal (or partitioned) parallelism. Similarly, a tree of operators can run independently of another tree of operators. Partitioning of execution is extremely useful in operational DSS queries where large volumes of data are being scanned, joined, and sorted. Consider the following example query:

1: /* Example */
2: select state, sum(order_item)
3: from customer c, order o
4: where o.customer_id=c.customer_id
5: group by state
6: order by sum(order_item)

In the above example two tables, the customer table and the order table, are being scanned. This is followed by a join operation to get the orders that belong to a particular customer. A group by (also referred to herein as a "GroupBy")

operation groups the orders by state and sums the order amount for each state. Finally, the orders for each of the states are sorted so that they appear in the order of the sum.

By using horizontal parallelism, execution of each query operation can be divided into sub-tasks and executed in parallel across multiple storage units and CPUs. Therefore, if the customer table is partitioned across several disk devices, which can operate in parallel, the database can initiate multiple scans to be performed in tandem. Now if the customer and order table can be repartitioned in such a way that it can be initiated across multiple devices or at least on the ones where data resides, then one can employ multiple devices to work on this operation in tandem as well. The joined rows could now be further repartitioned (e.g., in memory buffers) on the attribute state and sent to different CPU threads to evaluate the grouped aggregate operations in parallel. Vertical parallelism assists in the execution of the query by allowing intermediate results to be pipelined to the next operator. In this case, while data is scanned, it can be sent to the join operation, and while the join operation is done it could be further piped to the grouping operation. This form of inter-operator parallelism is the pipelined form. For example, to begin with an operator A can produce data at its output which then becomes an input source of data to another operator B. Operator A, the producer of the data, and operator B, the consumer of the data, work in tandem. This two-step parallelism, horizontal and vertical, is of great significance in parallel query processing.

Parallel Query Execution Using Iterators

The present invention provides for encapsulation of query results using iterators. These iterators are self-contained software objects that accept a stream of rows from one, two, or multiple data sources. The role of an iterator is to process many iterations of a data set across many nodes in serial or parallel. Iterators do not know what the source of a data stream is; whether it is the contents of a disk file, a network connection, or even another iterator. For each iteration of a data set, the iterator applies a predefined behavior to the data set being processed, manipulating the data according to the specification of that iterator. For example, scanning database rows from a database on disk can be the behavior of one type of iterator. By using iterators complex queries are structured by stringing together appropriate operators into a tree structure. Some of the most common type of iterators are: scan, nested loop join, hash join, groupby, sort, and merge. Scan is used for scanning a table or index, partitioned or unpartitioned. Nested loop join performs the standard nested loop join algorithm. Hash join implements the hash join method. A hash join inherently has the notion of which data set to use for the build operation and what to use for the probe operation, normally designated by the left and the right operands respectively. Groupby is used to implement GROUP BY and aggregates. Sort is used to implement the sort enforcer and merge is used to implement a merge join or a merge union. Iterators are a very convenient way of implementing "relational" operators and in this document the terms operator and iterator are used interchangeably and simultaneously.

Figure 3A:
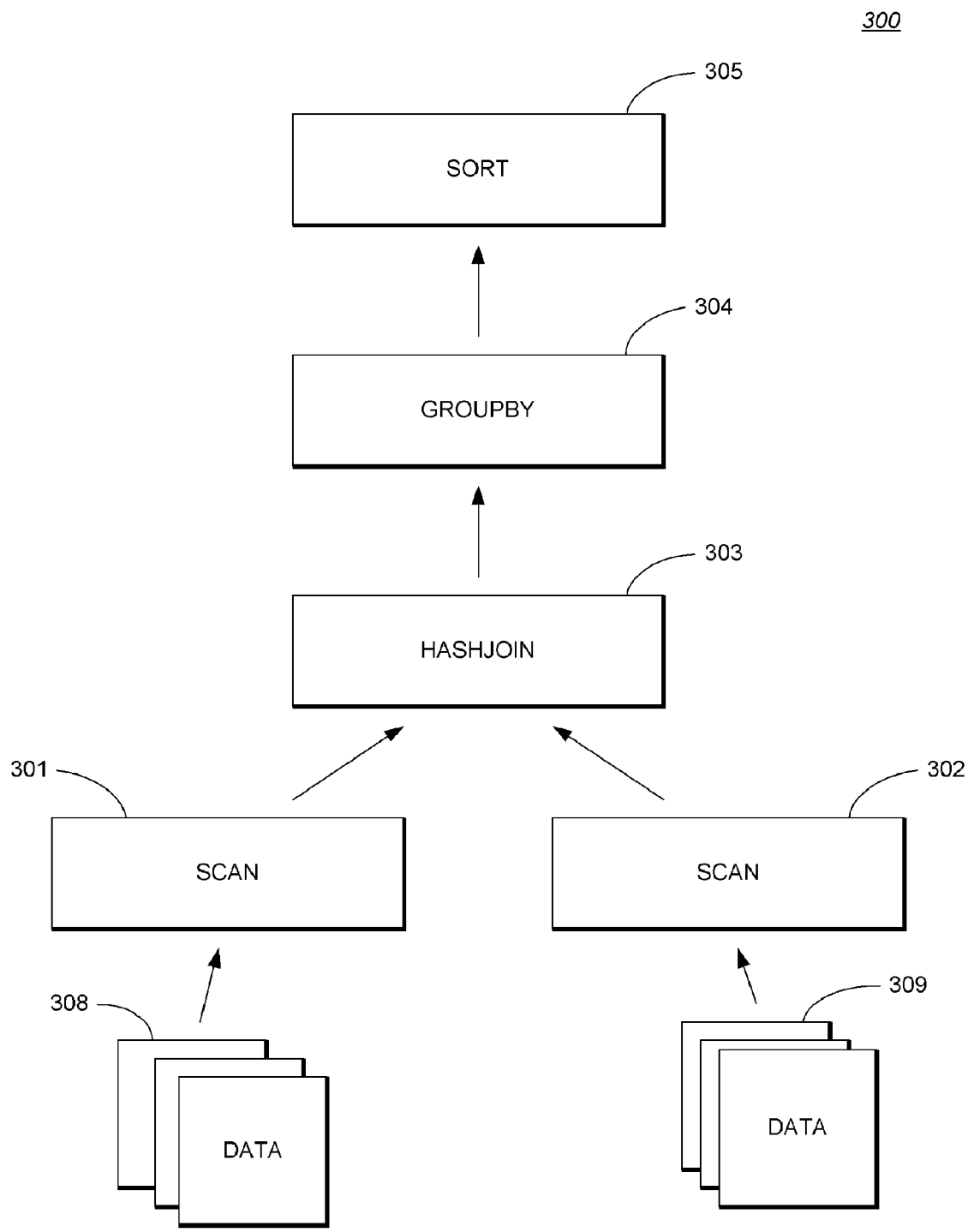
FIG. 3A is a block diagram of a serial operator tree illustrating a serial plan for executing a query.

The following discussion will describe how iterators are used to structure complex queries. FIG. 3A is a block diagram of a serial operator tree 300 illustrating a serial plan for executing a query. As shown, order and customer tables (data 308, 309) are scanned by two separate scan iterators, 301 and 302, respectively. Once these tables are scanned, results are sent to the hash join iterator 303 to be matched. The joined rows are then sent to the grouping iterator (GroupBy) 304 that performs a grouping operation based upon the state codes. Finally, results from the grouping (GroupBy) iterator 304 are passed to the sort iterator 305. The sort iterator 305 sorts the results. Among the key benefits of using iterators are that the iterators are self-contained entities that maintain their own states, and they can be easily duplicated for horizontal parallelism across CPU and I/O threads.

Pipelining with Repartitioning

An important point about parallelizing a query is to initiate as many iterators as possible and spread them across multiple disk and CPU resources for processing. In the currently preferred embodiment of the present invention a component called an exchange operator is used for these purposes. An exchange operator (also referred to herein as an "Xchg" operator) is simply another class of iterator that is more like a control operator. Its behavior is to affect parallelism. The query optimizer of the present invention inserts exchange iterators at suitable points in the operator tree to take advantage of parallelism wherever it may prove to be beneficial.

The exchange operator marks the point in the operator tree where all of the operators in a subtree are executed by a newly created producer process. The subtree that is executed by the producer process commences at the point of the exchange operator and continues down the operator tree structure to the next exchange operator (if there is one) or a leaf node. The exchange operator now becomes a consumer for the data produced below the exchange. Thus the exchange operator permits concurrent execution of complex query evaluation plans in multiple cooperating processes. The exchange operator allows pipelining of intermediate results from one set of operators (i.e., producer tasks) and initiates another set of operators to process the next request (i.e., consumer tasks). The exchange operator takes the data from the producer tasks and is capable of redistributing data for a different degree of parallelism in its consuming tasks. This is extended to redistribution of data to multiple servers on a cluster for processing the data. The exchange operator hides the actual intricacies of pipelining and rerouting data. For example, once a scan operator starts processing data the exchange operator immediately repartitions the data and redistributes it to the hash join operator (iterator).

Figure 3B:
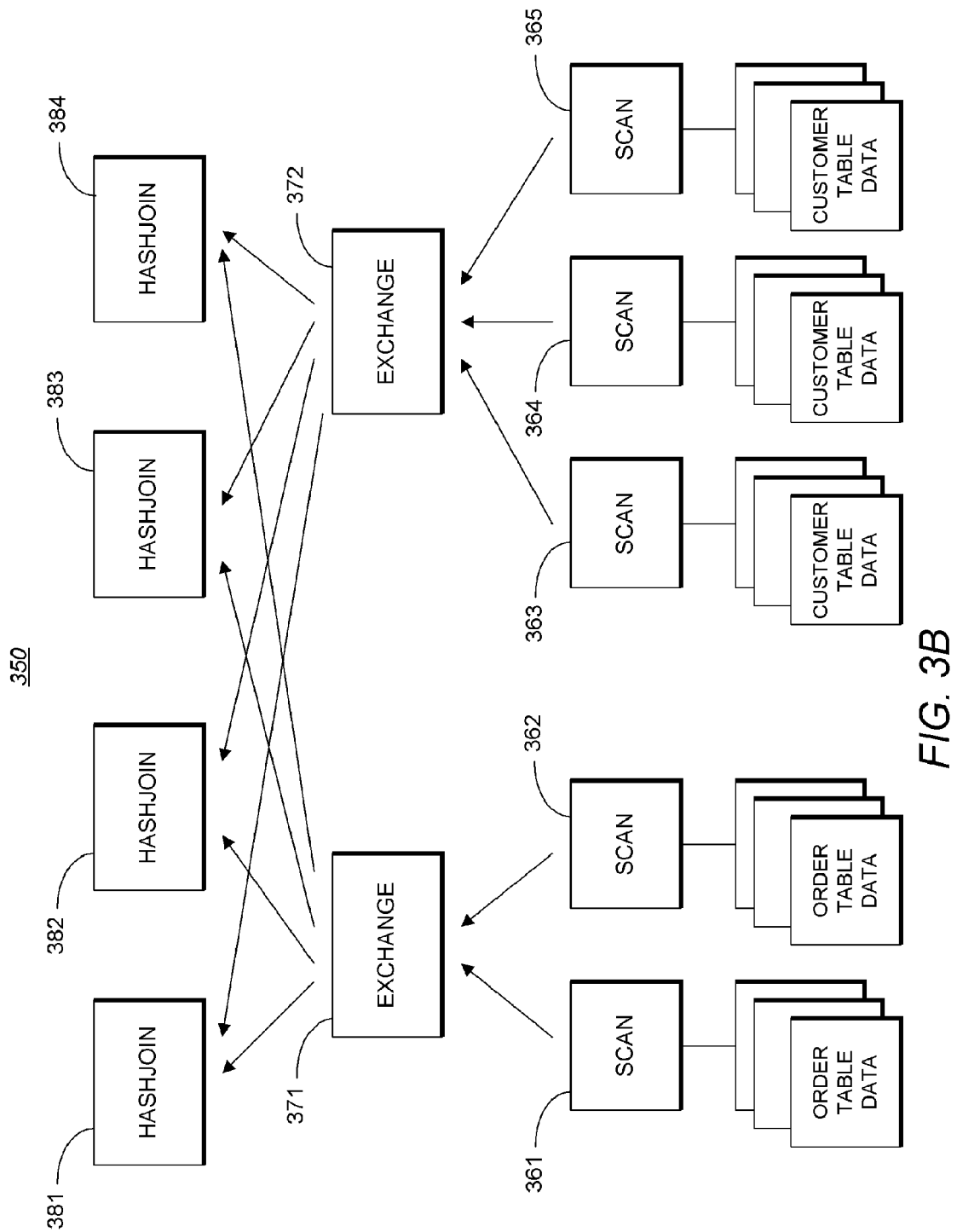
FIG. 3B is a block diagram of a parallel operator tree fragment illustrating how exchange operators (iterators) are used to parallelize the serial query execution plan of FIG. 3A.

FIG. 3B is a block diagram of a parallel operator tree fragment 350 illustrating how exchange operators (iterators) are used to parallelize the serial query execution plan of FIG. 3A. (Note that the GroupBy and Sort operators depicted in FIG. 3A are not included in FIG. 3B to simplify the diagram.) In FIG. 3B, an order table (data) is scanned in parallel by two threads, 361 and 362, while the customer table is scanned in parallel by three threads 363, 364, and 365, respectively. The two scan operators 361, 362 are in fact two clones of the scan operator 301 of FIG. 3A scanning the order table, while the three scan operators 363, 364, 365 are clones of the scan operator 302 of FIG. 3A scanning the customer table. This illustrates the versatility of the exchange iterator. The additional scan threads, which are spawned by the exchange operators 371 and 372, capitalize on horizontal parallelism. The data is then repartitioned on-the-fly (i.e., in memory) by a routing function, which hashes on the joining attribute. The hash join is the consumer of this data and it is executed in parallel by four threads 381, 382, 383, 384. The four hash join operators 381-384 are four clones of the hash join operator 303 of FIG. 3A joining the two relations. While the five scan operator threads 361-365 produce data, the four hash join operators 381-384 consume data for the purpose of initiating the build. It should be noted that one can easily substitute these threads for servers on other nodes while still using this parallel execution mechanism. Although only two exchange iterators are shown at FIG. 3B, this does not imply that the exchange iterator has only one clone. The exchange iterator has a producer side and a consumer side to it. The producer side of the exchange is run by the number of producer tasks running the relation operator clone below the exchange, while the consumer side runs the consumer part of the exchange in as many clones as the consumer operator needs to run.

Parallel Optimization and Resources

A general goal of a query optimizer is to speed up the process of executing a query and returning the results. In general terms, speeding up a query (i.e., reducing query response time) can be achieved in two different ways. A first way to achieve the goal of reducing response time is by reducing the total amount of work that needs to be done in executing the query. A second way to achieve this goal is divide (or partition) the work that needs to be done in executing the query among multiple processors. This can allow a given query to take advantage of unutilized (or underutilized) resources. The system and methodology of the present invention minimizes query response time by judiciously interleaving and balancing the execution primitives to take advantage of the available resources, with the assumption that throughput remains unchanged. The result provided by the parallel execution strategy of the present invention is a substantially reduced query response time.

One of the deterrents to fulfilling this objective of improved query response time is that there may be some basic limits on how work can be partitioned. The available parallelism may be such that it is difficult to partition work evenly amongst available processors. The response time for a given query depends on the time at which all of the processors have been able to complete their assigned tasks, which in turn means that any kind of skewed processor loads may reduce the benefits provided by a parallel execution strategy. In some cases, processor fragmentation, which essentially leads to the inability to allocate sufficient resources at a required time, causes a significant delay in the start-up of parallel subtasks. In addition to these, there are other known problems, which include being unable to create enough parallel sub-tasks to be able to use all processors/resources. One other source of difficulty is the fact that partitioning generates an additional amount of work. Thus, the overhead of exploiting parallelism may reduce the beneficial aspects of parallel execution in some instances.

Before describing how the present invention parallelizes a query, the possible ways of parallelizing a query will be briefly described. Alternatives for parallelizing a query include the following: (1) the parallel optimization proceeds while plans are generated for serial execution; (2) the best serial plan is taken and optimized for parallel execution; or (3) perform minimal optimizations at compile time and devise a run time optimization scheme. In the third alternative, minimal optimizations are performed at compile time. One disadvantage of this approach is that execution time (run time) optimization has significant overhead because it has to address problems that are unsolvable in polynomial time. Additionally, it also has drawbacks in being able to predict actual resource usage (i.e., any information is instantaneous and does not reflect the steady state of the system). However, the other two alternatives (parallel optimization with plans generated for serial execution and serial plan optimized for parallel execution) appear to be at two extreme ends of the spectrum. It is difficult, if not impossible, to determine which of these alternatives is a better choice, or if there is another reasonable approach.

The present invention includes methodology for establishing cost criteria that enables one to determine with reasonable accuracy whether a parallel plan (e.g., plan P1) is better than an alternative parallel plan (e.g., plan P2). This cost criteria involves a cost vector rather than a single scalar cost. Plan P1 is cheaper than plan P2 if the cost vector of plan P1 is cheaper than the cost vector of plan P2 (i.e., plan P1 has less cost than plan P2 in each vector dimension). If plan P1 is cheaper than plan P2 in each vector dimension, plan P2 is pruned. Otherwise, both plan P1 and plan P2 will need to be kept. This reduces the pruning efficiency in the optimizer and the net result in many cases is a set of parallel plans. At this point, both parallel plans are taken, a schedule for each plan is determined from available resources, and the actual execution schedules for the pipelines in the query plan are computed. Schedules are discussed later in this document, but briefly, a schedule is a tree of dependent pipelines that are activated bottom up. All child siblings are activated first, and once their resource consumption has been met and tapered off, the parent is activated. This also establishes a lower bound on response time of each of these plans. The cheapest plan is selected as the final plan.

As described above, determining that a given parallel plan is better than another plan involves using appropriate cost metrics. The present invention defines new costing units in order to overcome the problem of evaluating parallel plans. These new costing units are called "average time", "critical path", and "volume". Average time indicates the average amount of work done by each processor on a machine. This includes time spent in processing instructions, disk I/O, and any network I/O. Critical path models response time. It indicates the maximum time taken by any of the operators in the plan tree. Volume models resource usage for a certain time frame. It is the product of resource usage (e.g., memory) and the time for which the resource is in use.

Plans are generated using a partitioning property as a criterion for each operator. In each of the optimization blocks there is already a pre-computed notion of what partitioning is useful and on what columns. At each stage of plan building, this notion of partitioning as a property to perform an efficient relational operation is taken advantage of wherever possible. In the present invention the query optimizer determines the most efficient way to partition data such that it minimizes the amount of work done by the query. This is described in more detail below in this document. It should also be noted that when the requisite partitioning cannot be obtained from an operator, Xchg operators can be used as enforcers to split the data according to some partitioning condition on the intermediate data. This allows the system to give the partitioning required in upstream data processing.

Semantic Partitioning of Sample Queries

The semantic partitioning methodology of the present invention can be illustrated by example. As discussed above, the present invention provides for automatically splitting "attribute sensitive" relational operators into multiple parallel operators. Consider, for example, the following query requesting data from table A with data grouped on column A1:

SELECT COUNT (*), A1
  FROM A
  GROUP BY A1

For purposes of this discussion, assume that the above query is received and that the data is table A is not partitioned. The optimizer will generate candidate plans for execution of the query, with one or more of the candidate plans providing for partitioning data from table A during execution of the query. The optimizer will also generate a serial plan which may be more advantageous than the parallel plans for certain queries (e.g., queries handling small amounts of data). FIGS.

4A-B are block diagrams illustrating operator trees for serial and parallel plans which may be built by the optimizer for executing this example query.

Figure 4A:
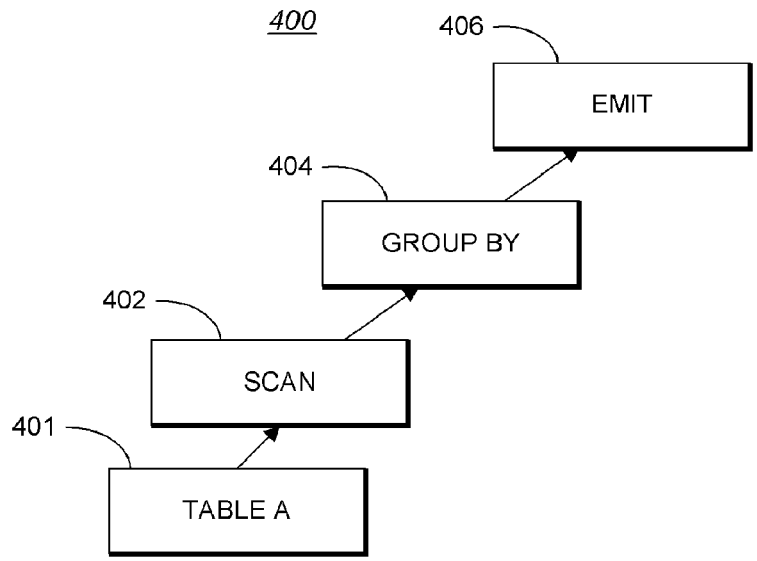
FIGS. 4A-B are block diagrams illustrating operator trees for serial and parallel plans which may be built by the optimizer for executing a query.
Figure 4B:
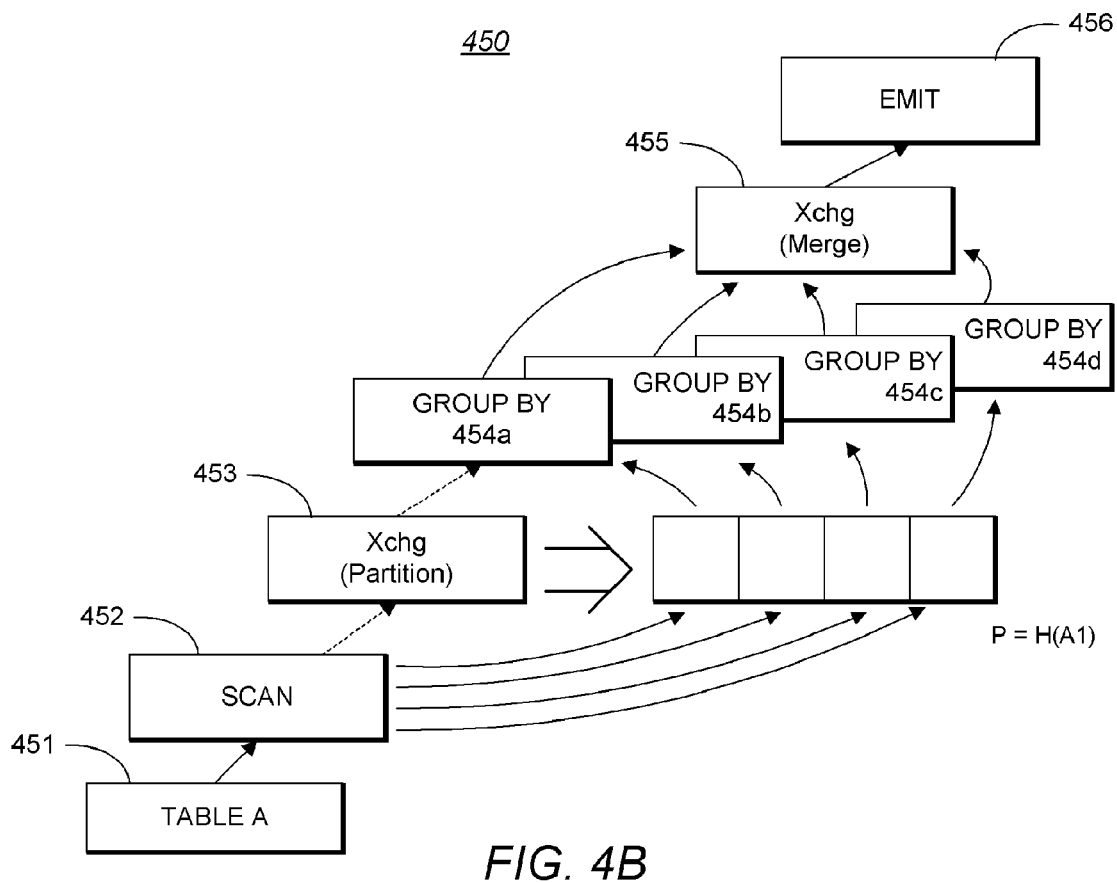

FIG. 4A is a block diagram of an operator tree of a serial plan 400 for executing the query. As shown, a scan operator 402 scans the data from table A 401 (e.g., on disk) and a Group By operator 404 groups the data on the grouping column (A1). The emit node 406 emits the results to the client. FIG. 4B illustrates an operator tree of a parallel plan 450 for executing the same query based on partitioning the data and performing the grouping operation in parallel. As with the serial plan, the Scan operator 452 at the bottom of the parallel plan operator tree 450 scans table A 451 to read in the data from disk in a serial fashion. However, with the parallel plan 450 shown at FIG. 4B, an Xchg operator 453 is inserted between the Scan 452 and the grouping operation (Group By) 454. This Xchg operator 453 implements what is referred to as "data pipes" for splitting (partitioning) one stream into multiple streams. The Xchg operator 453 has these data pipes effectively "built in" to it. The Xchg operator 453 also has a partitioning strategy. In this example, the Xchg operator splits the incoming data stream into four data pipes (streams) and applies a partitioning strategy P which is a hash-based partitioning strategy (H) on column A1, all as shown at FIG. 4B. Note that although this example illustrates splitting the data into four pipes, those skilled in the art will appreciate that the data could be split into a different number of pipes (e.g., 8 pipes, 20 pipes, 128 pipes, etc.) depending on the quantities of data involved and other factors (e.g., number of processors and the number of worker threads configured in the system). Essentially, in this parallel plan 450 the Scan 452 reads the data row by row and hashes on A1. Depending on its hash value, a data row is placed into one of the four pipes (e.g., memory buffers) of the Xchg 453 as shown at FIG. 4B. Next, the Group By operation essentially clones itself four ways so that each of the four Group By operators 454a, 454b, 454c, 454d will read the data from one of the four pipes and group the data in that pipe. This serves to parallelize the grouping operation. Above the grouping operation another Xchg operator 455 is inserted into the plan between the grouping operator(s) and the Emit 456. This Xchg operator 455 is a merge pipe that merges the data from the four pipes (i.e., the four Group Bys 454a, 454b, 454c, 454d) into a single pipe so that the Emit node 456 will receive the one stream of data that it expects rather than four separate streams of data.

As illustrated by this example, the parallel plan generated by the optimizer will typically include several additional operators when compared with the serial plan. In evaluating serial and parallel plans, the extra overhead of these operators of a parallel plan may make a parallel plan less efficient than a serial plan, if the amount of data that is to be processed is small. However, if larger quantities of data are involved, a parallel plan will typically provide better performance as the advantages of performing relational operations (e.g., the grouping operation as shown at FIG. 4B) in parallel will usually outweigh the additional overhead of the parallel plan.

In the currently preferred embodiment of the present invention, the optimizer evaluates the quantities of data that are involved during query optimization for determining the degree of partitioning that may be advantageous for particular relational operations. If the amount of data involved exceeds a certain threshold (e.g., 20 or more data pages), the optimizer will generate and consider parallel plans during the search space inspection phase of query optimization. If the amount of data is below the threshold (e.g., less than 20 pages), then parallel plans are currently not generated or considered as they are not likely to be advantageous. In the currently preferred embodiment, a threshold of 20 data pages is used; however, those skilled in the art will appreciate that various other thresholds or approaches could be used, if desired. Similarly, the number of pipes that are created in the parallel plan (e.g., for purposes of the grouping operation with the above example query) is also dependent upon the quantities of data that are involved as well as other factors (e.g., number of available processors).

The present invention also includes techniques for efficiently handling other relational operators which are not "attribute sensitive" operators. One example of an operation which is not "attribute sensitive" is a scalar aggregation. Consider, for example, the following query:

SELECT COUNT (*)
FROM A

Assuming that the data in table A is already partitioned, executing this query in parallel requires not only a first level aggregation on each of the partitions, but also a second level aggregation to generate the results across all partitions. The second level aggregation adds some additional expense in executing the query, but the trade off is that the first level operations can be performed in parallel across the partitions rather than in serial for the entire table. Thus, if table A contains a large quantity of data, performing these operations in parallel is likely to be more efficient than performing them in serial, even though there is some overhead associated with the additional operations which are inserted by the optimizer to partition the data and process the partitions in parallel.

Figure 5A:
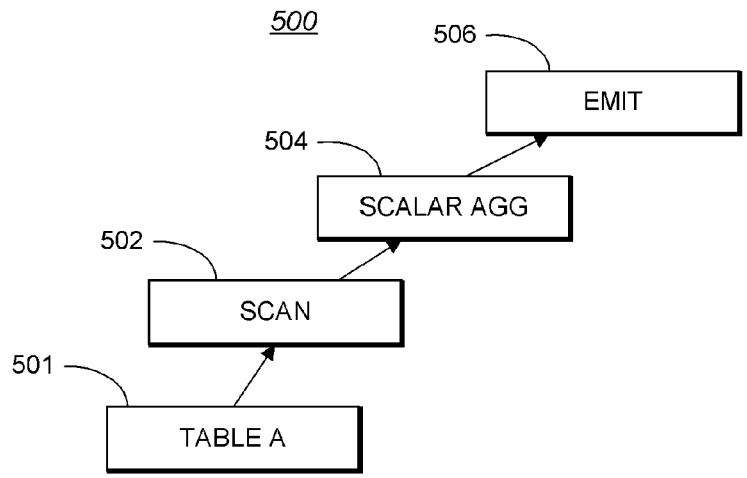
FIGS. 5A-B comprise block diagrams illustrating operator trees created for serial and parallel plans for a query involving a non-attribute sensitive operation.
Figure 5B:
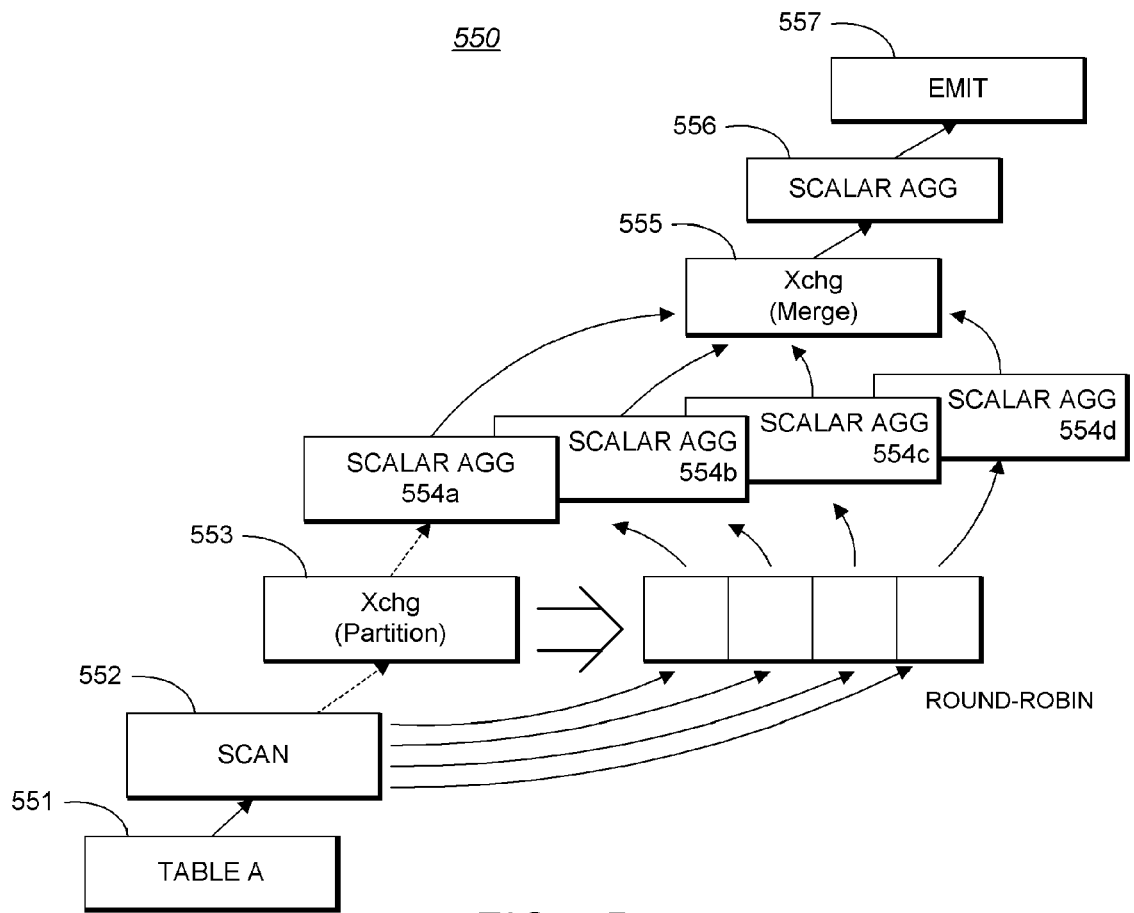

FIGS. 5A-B comprise block diagrams illustrating operator trees created for serial and parallel plans for an example query involving a non-attribute sensitive operation. For purposes of this discussion, assume the above example is a select query including a scalar aggregation and further assume that table A is not partitioned. Unlike the first example involving a grouping on a particular column, in this case there is no column on which the data can be partitioned. As shown at FIG. 5A, the operator tree for a serial plan 500 simply includes a Scan operator 502 for scanning table A 501, a scalar aggregator (Scalar Agg) 504, and an emit node 506. In this serial plan, the scalar aggregator 504 counts every row in a serial fashion. Assume, for example, that the result emitted is a count=4001.

The operator tree for a parallel plan 550 for this same query is shown at FIG. 5B. As shown, an Xchg operator 553 is inserted above the Scan 552 to split the data into a plurality of pipes. In this example, the data is split into four pipes. Note that no particular partitioning strategy is required; the data can be split by simply allocating data rows to each pipe in a round-robin fashion. Once the data has been split into the four pipes, the Scalar Aggregator (Scalar Agg) is cloned four ways, with each of the Scalar Agg clones 554a, 554b, 554c, 554d processing data in one of the pipes. For example, the count for each of the four pipes may be as follows: 1000, 999, 1001, 1001. The performance advantage of the parallel plan 550 is that multiple worker threads perform the count rather than a single worker thread as in the case of the serial plan. After the rows in each of the four pipes have been counted, an overall count must be still be generated. Accordingly, another Xchg operator 555 is inserted above the cloned Scalar Aggregators to merge the four streams from the four clones. In addition, another Scalar Agg operator 556 is inserted to sum the counts from each of the four pipes so that a single count can be emitted. This Scalar Agg operator 556 sums the counts (e.g., 1000+999+1001+1001=4001) and the results are emitted, as represented by emit node 557.

System Components

Figure 6:
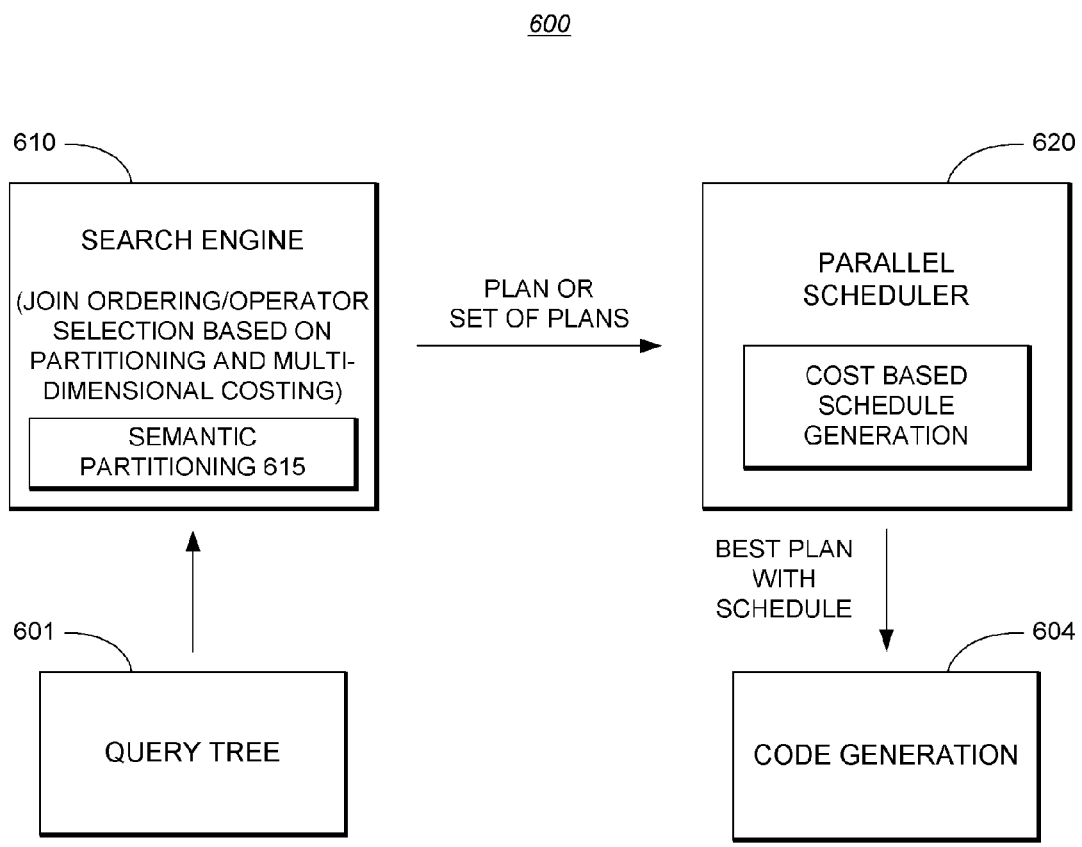
FIG. 6 is a high-level functional diagram illustrating the two phases of optimization performed in the system of the present invention.

FIG. 6 is a high-level functional diagram 600 illustrating two general phases of optimization performed in the optimizer of the present invention. As shown, a query tree 601 is received by a search engine 610. The search engine 610 is a core component of the query optimizer that generates and evaluates alternative execution plans. In the first phase of optimization, the search engine 610 generates a set of plans including join ordering/operator selection based on partitioning and multi-dimensional costing. The functionality of the present invention for semantic-based partitioning resides in the search engine 610 as represented by the semantic partitioning module 615. During the search space inspection phase of query optimization, the search engine generates and evaluates various alternative partial and complete plans for executing the query. Partial and complete plans that are determined to be unfavorable are pruned, so as to remove them from future consideration as described below in more detail. For example, the search engine may generate a serial plan and one or more parallel plans as alternate candidate plans for executing a given query. In some cases the search engine may be able to prune one or more of these plans (e.g., the parallel plans for a simple query involving only a small quantity of data). However, in other cases the search engine may not be able to identify a single best plan and may output a plurality of candidate plans to the parallel scheduler 620.

The plan or set of plans generated by the search engine 610 is then provided to the parallel scheduler 620. In the second general phase of operations, the parallel scheduler 620 is responsible for cost based schedule generation. The parallel scheduler 620 receives as input a set of operator trees (plans) with resource vectors and known partitioning. As shown at FIG. 6, the output from the parallel scheduler 620 is a best operator tree with its schedule that is used by the code generator 604 as the basis for generating the query execution plan. Further description of parallel schedule generation in a query optimizer is provided in commonly-owned, presently-pending application Ser. No. 10/711,931, entitled "Database System with Methodology for Parallel Schedule Generation in a Query Optimizer", the disclosure of which is hereby incorporated by reference.

Detailed Operation

Partitioning Schemes

Partitioning schemes are pivotal to the improved performance of parallel optimization strategies. There are different kinds of partitioning strategies, including round robin partitioning, range partitioning, hash partitioning, and list partitioning. Each of these will be briefly described. Round robin partitioning is a scheme that is best suited for load balancing. In this scheme the data set is distributed in a round robin fashion without any attention to where a data value ends up. In short, there are no semantics associated with such a partitioning scheme (i.e., given a row of the data set, one cannot say with certainty as to which partition a given row would belong to). In a range partitioning scheme, a data set for one or more attributes is partitioned on the value range. Thus, every row can be pinpointed to a given partition. Although range partitioning is not known for being capable of having balanced partition sizes, it does give rise to interesting optimization techniques. In hash partitioning, the attributes on which the partition is defined are from a row in the data set and are used as parameters for a suitably chosen hash function to locate a partition. Since hash partitioning has well-defined semantics, a given row in a data set can be tied to a partition. As with range partitioning, this gives rise to some optimization capabilities. In addition, hash partitions are chosen when a user or the optimizer leaves the responsibility of well-balanced partitions to the merit of the hash function. With list partitioning, the attributes in a list partition map to a specified set of literals for each partition. For example, a "state" column can be partitioned into East coast and West coast states, where the East coast partition is defined as: "state in ('NY', 'VA', 'NH')" and the West coast partition is: "state in ('CA', 'OR', 'WA')". This is also a kind of partitioning where a tuple could be explicitly ascribed to a specific partition.

Having introduced partitioning and the parallelism that ensues from it, the following discusses the different partitioning strategies that may be used to obtain the correct semantics for a relational operation and at the same time be able to generate parallel plans for the relational operation. In the following discussion, table names are referred to in single upper case letters (such as A,B) and lower case letter followed by a numeric digit to refer to attributes (a1, a2, b2). In addition, an upper case "I" followed by the table name to refer to indices (indexes) with an optional digit after the name if multiple indices are needed for an illustration, (like IA, IA1, IA2), and an upper case "P" followed by the table name for indicating partition names. There may be an optional digit after the partition names to indicate multiple partition names (e.g., PA, PA1). Attributes on which the indices and partitions are defined are placed in parenthesis (e.g., PA(a1,a2) or IB(b1,b3)).

Partition Elimination

The present invention provides a semantic-based partitioning methodology. This means that given a query that has predicates on the partitioning keys, it is possible to find out which partitions qualify a given predicate. However, predicates that are currently useful for partition elimination must qualify as conjunctive or disjunctive predicates on a single table of the form: col relop (literal). A compelling example can be used to further illustrate this notion. Assume for purposes of this example that a sales table sales (quarter_year, quarter_number, sales_date, sales_amount) exists and the table is partitioned on (quarter_year, quarter_number) such that there is a partition corresponding to every quarter. Further assume that a user runs the following query:

select sum(sales_amount), sales_date
from sales
where quarter_number=4 and
quarter_year>1995 and quarter_year<=2000

The partition elimination process is able to identify that only the partition for the fourth quarters of 1996 to 2000 qualify for this query. Hence, other partitions will not be scanned, thereby saving considerable time and resources. There are two additional points to mention in this context. First, partition elimination is done for range partitioning using both equality and inequality predicates. Predicates with "not equal to" or complex predicates that have expressions on the partitioning column are generally not used for partition elimination. The type of predicates used in the query should adhere to the predicate form shown above (i.e., col relop (literal)). Any predicate that does not adhere to this form generally is not used. Examples of cases where partition elimination will not be attempted include the following: "select * from table_1 where col_1+2=30 and col_1 !=25". Another example is "select * from tab_1 where sin(col_2)= 0.2". A third example is as follows: "select * from tab_1 where col_1 !=30".

In addition, partition elimination is also performed for hash partitioning and list partitioning. In the case of hash partitioning, only equality predicates are considered. Consider the following example of another query where the same information as requested above needs to be obtained for the fourth quarters of 1995 and 1996 as well as all quarters of 1998:

select sum(sales_amount), sales_date
from sales
where (quarter_number=4 and
quarter_year in (1995, 1996)) or quarter_year=1998

The partition elimination process of the present invention is able to locate the relevant partitions. An important point to note here is that partition elimination generally applies only to scans, inserts, deletes and updates and not to other operators in the serial mode. Once partitions are scanned, the notion of partitioning is lost upstream in the serial mode, but retained in the parallel mode. As another example, assume the following query is received:

insert into sales (quarter_number, quarter_year, sales_date, sales_amount)
values (3, 2001, "Aug. 12, 2001", 5000)

In this case, the insert operator is able to determine which partition the data needs to go to. However, it may have to additionally find out what index partition the data needs to be inserted into and that is not determined in the optimizer. Currently, no partition elimination is done on insert-select statements where the source of the data and its partitioning could be possibly mapped to the destination data and its partitioning. In case of deletes and updates, the source of the scan is subjected to the process of partition elimination. For example, assume the following query is received:

update sales
set sales_amount=sales_amount*1.2
from sales, orders
where sales_date=order_date and quarter_number=2

In this case, partition elimination is done using quarter_number=2 as a predicate and the correct partitions identified. Target partitions for delete and update can also be identified if there is a predicate on the partitioning column on scans. Taking the above example, scan gives a cursor position for a row to be deleted and/or updated, such that any partition elimination on scan side becomes relevant for update/delete operators as well. Partition elimination can also be extended to multi-table for equi-join queries. Here, the optimizer of the present invention eliminates the partitions that do not qualify from either or both sides of the join. Assume a table, accounts (quarter_year, quarter_number, ac_name, ac_amount), that is partitioned based on quarters is joined with a table, sales (partitioned as described above) and the following query is received:

select * from sales, accounts
where sales.quarter_number=accounts.quarter_number and
sales.quarter_number=4 and
sales.quarter_year>1995 and
sales.quarter_year<=2000 and In this case, the optimizer ensures that quarters 1 to 3 are eliminated for the years 1996 to 2000 from both accounts and sales tables before the join. In addition to the form of partition elimination described above and often called "static partition elimination", the present invention uses another mode of partition elimination called "dynamic partition elimination". In this mode, unbound predicates are used for partition elimination. These are predicates that have constants that are unknown at optimization time. This could be a local variable or a parameter to a stored procedure or a function that can only be computed at runtime. The following are some of the examples of queries with these kinds of predicates:

select * from sales where quarter_year>@v
select * from sales where quarter_year=@v1

With the first query ("select * from sales where quarter_year>@v"), not much can be done at optimization time. One has to assume the worst case where all of the partitions qualify the predicate. However, at execution time partition elimination can be performed and the actual partitions identified. In the case of the second query ("select * from sales where quarter_year=@v1"), it is known that only one partition will qualify. Hence, the scan in this case will qualify a single partition and will not be done in parallel. The actual partition is identified at run time as previously. The different operators and the various parallel strategies that are considered by the optimizer will now be described in more detail.

Table and Index Scan Operators

Figure 7A:
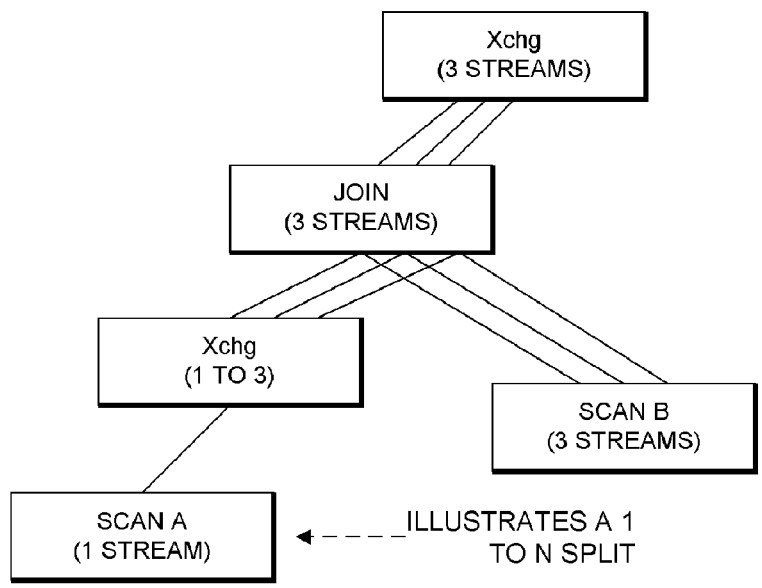
FIGS. 7A-D comprise block diagrams of operator trees illustrating several OR strategies.

Scan operators, namely table scan and index scan, are fixed operators, which means that there are not a whole lot of options to parallelize them. Once the stream has been read from the base relations or indices, it can thereafter be split into multiple streams. It is to be noted that currently an unpartitioned relation will not be allowed to be read by multiple threads. The upside of this strategy is that it allows the system to parallelize scan operations with any number of threads, subjected to the number of pages in the table or index, unlike the classical Lava (lava execution engine) style of parallelism, where a worker thread is only allowed to read one or more partitions. A table or index cannot be read with more number of threads than the partitions it contains. There have been instances where, owing to lack of information, hash based parallel scans of unpartitioned relations has resulted in a degradation of performance. A specific example included a hash-based index scan chosen as an inner relation in the join order. Owing to a deficient cost model, it is almost impossible to estimate the randomness of the I/O and such a strategy worked with a reasonable degree of success only if chosen as an outer table in the join order. Another problem with such a strategy is that it does not provide the I/O isolation that is required for such scans to work with a reasonable scale up and causes a random movement of the disk heads. The following is an illustrative example: "select a1, a2 from A, B where a1>0 and b2=a2". In this example, table A has no partitions, but has an unpartitioned index IA(a1) and table B has itself partitioned three ways on attribute b2 (i.e., its partitioning is PB(b2)). FIG. 7A is a block diagram of an operator tree for an example lava execution plan. As shown in FIG. 7A, a single producer thread (scan) reads the table and an Xchg operator splits the data into three pipes. The three consumer threads waiting to read data from the other end of the pipes (i.e., other end of the Xchg node) now send data up for the join clones to work in tandem on their respective datasets.

With a table scan operation, it is important to be able to determine which partitions of a table will participate in the scan operations. There are simple cases where some partitions can be eliminated due to the semantics of the scan predicates. Such cases may actually cause a partitioning to be altered in principle, but they are not currently altered in the actual implementation. Instead, partitions that are eliminated simply do not participate. In the currently preferred embodiment of the present invention, partitioned or unpartitioned tables cannot be scanned using a hash based partitioning scheme where N threads can scan M partitions using hash based strategy, where N>M. If N<=M, multiple work units are allowed to be scanned by a thread. The method that is currently used is that each of the (N-1) threads will perform a ceiling of M/N work units and the last thread will read the remainder of the partitions.

For index operators, both unpartitioned and local indexing schemes are supported. Local indices (indexes) refer to indices that are partitioned exactly as the data. Unpartitioned indices will have an impact on the index scans, especially on how to partition this work. Currently, the present invention handles it in a manner such that if an unpartitioned, non-covered, non-clustered index scan is done, hash based scans will be supported. The currently supported scans will hash on the underlying data page number and based on the hash value and its thread identifier, will find out if a data page is to be scanned by that thread or not. It is noteworthy that this does not lead to any semantic-based partitioning on the attribute values. If the underlying data is partitioned, the clustered index will need to be partitioned and a partitioned clustered index scan is supported. When using a local index, the ensuing partitioning is same as that of the data, irrespective of whether the scan is covered or not. If the index is unpartitioned, the resultant scan will also be considered to be unpartitioned (i.e., a serial stream of degree 1 will result).

Global indices are those where the index is partitioned differently than the data. The present invention includes support for a global prefixed non-clustered index. In such a case, if one does have a covered index scan, one can obtain the partitioning of the index and very good I/O isolation. However, if the index is not covered the index partitioning is still obtained, but the I/O isolation is not pronounced. Finally, the system also supports partition non-clustered index scan on an unpartitioned table. It has the same advantages and disadvantages as with the global prefixed non-clustered index.

OR Optimization

Figure 7B:
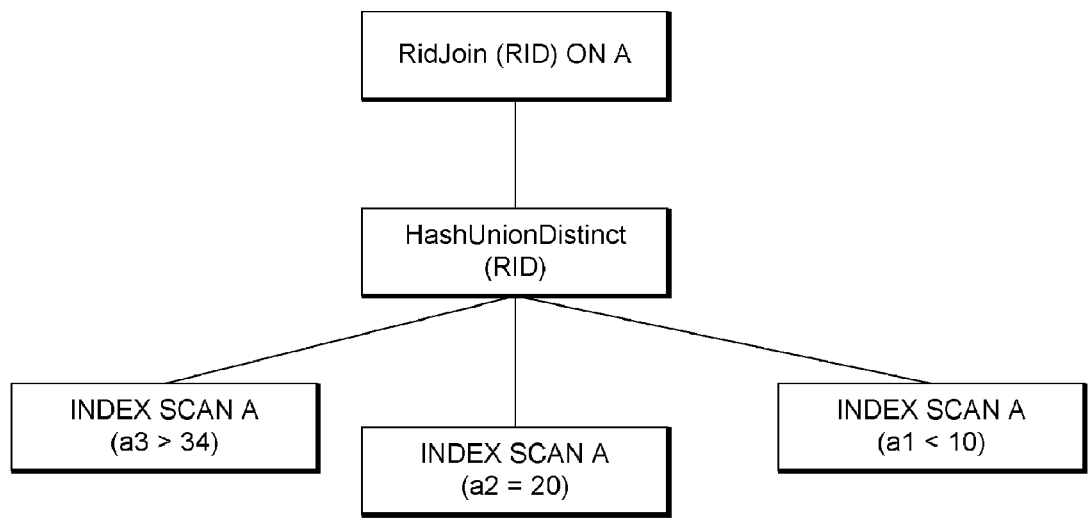
Figure 7C:
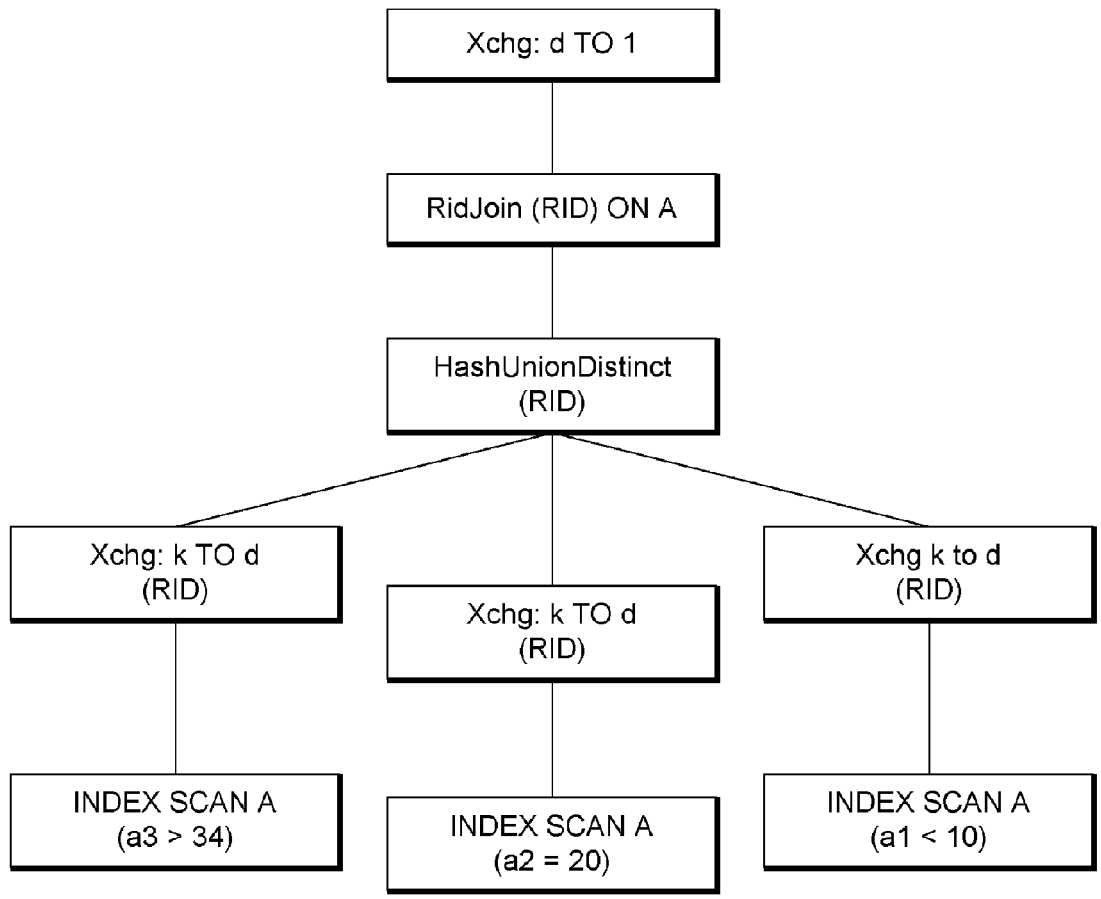

Currently, a general OR optimization is considered to be a Union All of each conjunction under the disjunction. This is followed by a duplicate removing operation (projection) for the RID of the base relation (in order to remove same tuples that qualify). Consider the following example query: "Select a1, a2 from A where a1<10 or a2=20 or a3>34". FIG. 7B is a block diagram of an example operator tree illustrating a general OR strategy (e.g., for the above example query). As shown, the general OR strategy for this example query does not employ any special operators and hence does not require any special treatment. If the scans are done in parallel because there is an index partitioning, the system still needs to repartition the index stream on the RID (row id), so that the union operator can be processed in parallel as well as the scans. Assume that there are local indices IA1 (a1), IA2(a2) with a degree of k and an unpartitioned index IA3 respectively and one would like to do a parallel OR strategy with a degree of d. As previously mentioned, the system has to repartition on the RID to be able to do a parallel union (e.g., HashUnionDistinct). Note that the same is true for sort based distinct. FIG. 7C is a block diagram of an operator tree illustrating a parallel OR strategy.

Figure 7D:
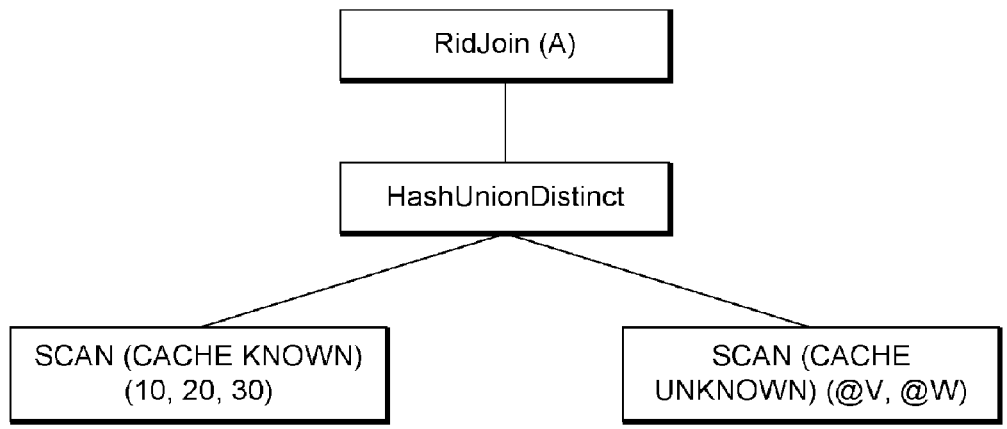

It is also to be noted that the OR strategy could be done in serial, if value of d is 1 and the parallel streams could be merged using N to 1 Xchg operator, thereby doing the union processing in serial mode. The top Xchg operator above the RIDJoin will then be superfluous. In the currently preferred embodiment of the present invention, a special OR strategy is implemented in a slightly different way. FIG. 7D is a block diagram of an operator tree illustrating the special OR strategy of the present invention. The operator tree shown at FIG. 7D is based on the following example: "select a1, a2 from A where a1 in (10, 20, 30,30) or a1=@v or a1=@w". As shown, there are two caches that are constructed: one for the known constants in the query and the other for unknown values (or values that become known at execution time). Next, a union of the scans of two caches is performed followed by a distinct enforcement and a subsequent join to the base table to look up the rows of the table. One thing to note is that the caches will be unpartitioned by choice. There are no special optimization strategies required for a tree like the one shown at FIG. 7D, since the methodology for how to parallelize these operators has already been dealt with in the context of other SQL queries. HashUnionDistinct can be parallelized the same way as with the general OR strategy.

Nested Loop Join

Nested loop join, particularly indexed nested loop join, is a popular optimizer strategy when a selective index exists on the inner table and the joining predicate can be used efficiently for an index scan. This creates a constraint on the partitioning strategy for an indexed nested loop join. Ideally, one would like to save the index on the inside and hence not allow dynamic repartitioning on the inside. Static repartitioning is still a viable option and the following discusses several cases of partitioning related to the operands.

Figure 8A:
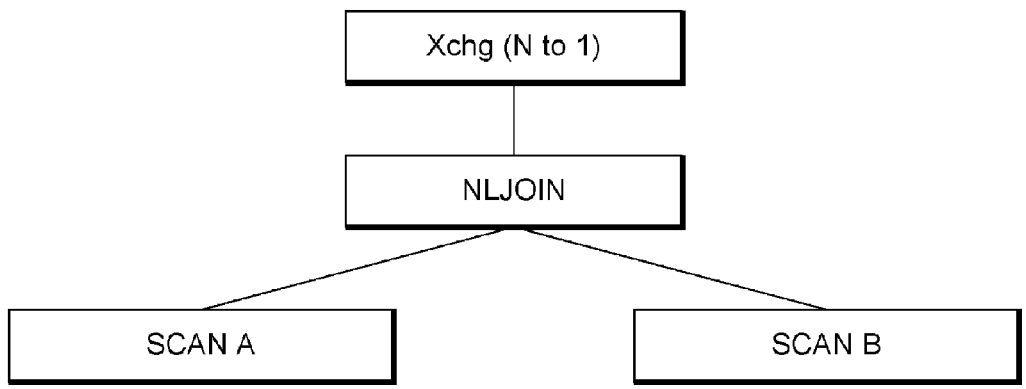
FIGS. 8A-G comprise block diagrams of operator trees illustrating several join partitioning and repartitioning strategies FIGS. 9A-E comprise block diagrams of operator trees illustrating several merge join partitioning strategies.

If both operands have the same partitioning (i.e., if the attributes used for partitioning are the same and the partitioning keys are a subset or the same as that of the join predicates), then this represents the best scenario. In this case, the system does not repartition any side of the nested loop join(NLJoin). The partitioning condition identifies the pairs of partitions that will have to be joined. The only case when repartitioning will be considered is for load balancing and things related to the parallel degree of an operator. FIG. 8A is a block diagram illustrating the operator tree for an equi-partitioned nested loop join. It is important to define the notion of equi-partitioning for joins. Two partitions are said to be equi-partitioned for join, if: (1) they are of the same type (e.g., both are range, both are hash, or both are list); (2) they have the same degree (i.e., they have the same number of partitions); (3) they have the same number of columns; (4) they (for range and hash) have the same literals in the boundary conditions; and (5) each column in corresponding ordinal position of partition key are connected by a join predicate. If there is a partitioning on (colX1, colX2, . . . colXn) and another on (colY1, colY2, . . . , colYn), there needs to be equi-join predicates colX1=colY1 and colX2=colY2 and colXn=colYn. If the partitioning for both operands are same and are a subset of the join predicates, then this will be considered a viable strategy. Consider the following query: "select a1, . . . ,a3 from A,B where a1=b1 and a2=b2". The following partitions are defined: Partition PA1 (a1), Partition PB1 (b1), Index IB1 (b2,b1). This is an example of an equi-partitioned join.

Partial overlap of join predicates with the partitioning is a topic of particular interest that will now be discussed. Consider a case involving range partitioning. If the range partitioning for both operands have a common prefix, that has the same ranges and degree, and the join predicate is a "superset" of that prefix, the join is still violated (i.e., it cannot be called an equi-partitioned join). In a first example, the degrees are different and PA(a1,a2,a3) partitions the data as follows: (<100, <"D", <"d"),(<100, <"D", <"z"),(<100, <"Z", <"d"), (<100<"Z", <"z"), (<200, <"D", <"d"),(<200, <"D", <"z"), (<200, <"Z", <"d"),(<200, <"Z", <"z")

In this first example, PB(b1,b2) partitions the data as follows:
(<100, <"D"), (<100, <"Z"),(<200, <"D"), (<200, <"Z")

One can see that the prefixes on (a1,a2) and (b1,b2) look similar, but they cannot be considered to be equi-partitioned, because their degrees are different. In a second example, the degrees are same and while still having PA(a1,a2,a3), there is also a new partitioning PB1 (b1,b2,b4) which is as follows:
(<100, <"D", <"m"),(<100, <"D", <"y"),(<100, <"Z", <"m"),(<100, <"Z", <"y"),
(<200, <"D", <"m"),(<200, <"D", <"y"),(<200, <"Z", <"m"),(<200, <"Z", <"y")

The matching prefix is (a1,a2) on the side of A and (b1,b2) on the side of B. Assume that the join attribute is a superset of this prefix. The problem is in joining partition number one of A: PA1 with partition number one of B: PB1, but failing to join the second partition of A with that of the first partition of B, which may also have tuples that can potentially join. Hence the join is semantically incorrect.

In a case involving hash partitioning, the partitioning on both the operands must be same and that the partitioning attributes must be a subset of the equi-join predicates. The idea is that once a row is obtained from any of the partitions, the joining attributes or a subset of it must be located in exactly one partition on the other operand, which is also hash-partitioned. Mathematically, the partitioning on the left operand must be exactly same as the partitioning on the right operand and either of them must be a subset of the join predicate.

With list partitioning, the columns should be same for both operands and each partition should have exactly the same literals. It appears that a partial overlap of join predicates with partitioning attributes can work in some cases, unless the number of partitions are far fewer and the partition sizes are very skewed. Thus, one can conclude that partial or complete overlap of join attributes in the equi-join predicates with partitioning attributes may allow one to avoid repartitioning, unless the partitions are unbalanced or the degree of the operator is sub-optimal.

Figure 8B:
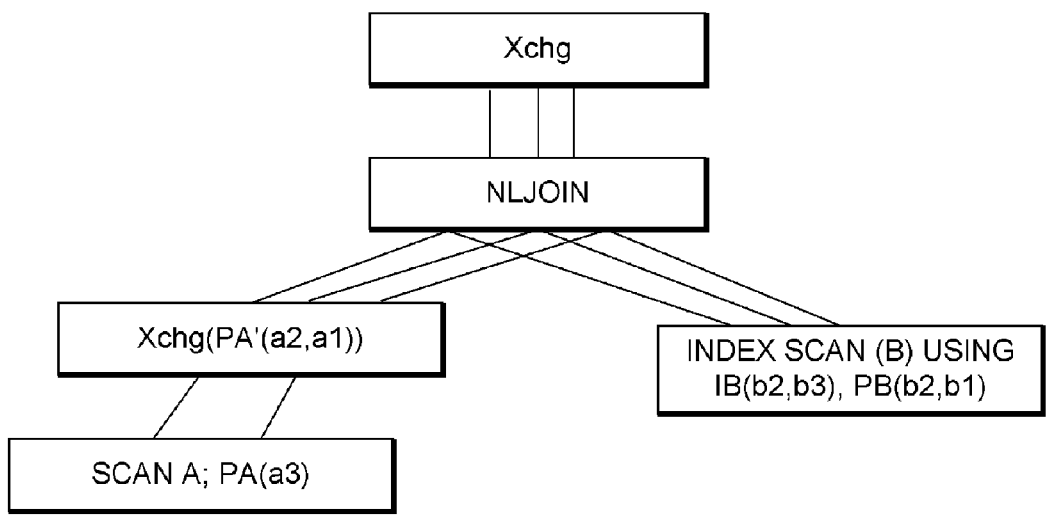

There are some differences if the operands have different partitioning. Assume the condition that the partitioning on the right hand side operand is a subset of the join predicates so that the right hand side partitioning is deemed to be useful. Under such circumstances, the left-hand side is repartitioned to match partitioning on right hand side. Consider the following example query "select a1 from A, B where a1=b1 and a2=b2". The partitioning on A is PA(a3), with two partitions and partitioning on B is PB(b2,b1) with three partitions and index IB on (b2,b3). A first solution is to repartition A only, to have a new partitioning PA'(a2,a1). FIG. 8B is a block diagram of an operator tree illustrating the repartitioning of an outer side of a nested loop join. As shown in FIG. 8B, the scanned stream from A is repartitioned to PA'(a2,a1) and then an equi-partitioned join is done at the Nested Loop Join level.

Figure 8C:
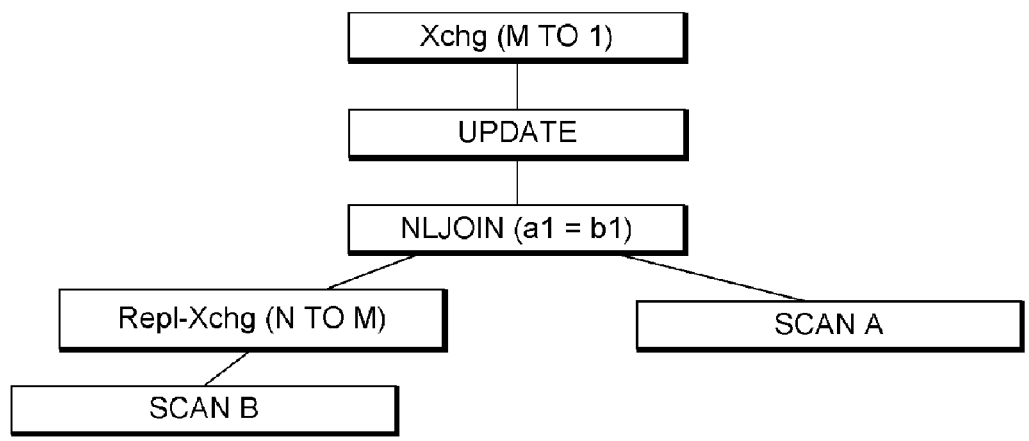

A second solution is to replicate A to B (i.e., each partition of A will be replicated to each and every partition of B). There is an issue as to whether this solution is of any use for the case mentioned, since replication might be more expensive than repartitioning. However, there is a specific situation in which this replicated type of partitioning may be useful, which is when it would be desirable to make an update or delete operation work in parallel. Consider the following query: "update A set a2=3 from B where a1=b1". FIG. 8C is an example operator tree illustrating replicated partitioning (e.g., replicated partitioning of this query). Assume that table A is partitioned on a column a3 and table B is partitioned on column b1. In this case, table A cannot be repartitioned on a1, because once an Xchg operator is put over the scan of A, the scanner and the updater will be working in two different thread spaces. In the current implementation of updates and deletes, it is necessary to have the scanner position itself on the row to be updated or deleted. While positioned on the row, the update or the delete operator updates or deletes the row in question. However, with an Xchg operator in between, the two operators update/delete and scan will be working asynchronously and this is likely to be problematic. In this situation, the system will need to either do all of the scans in serial or use the replicated join.

Figure 8D:
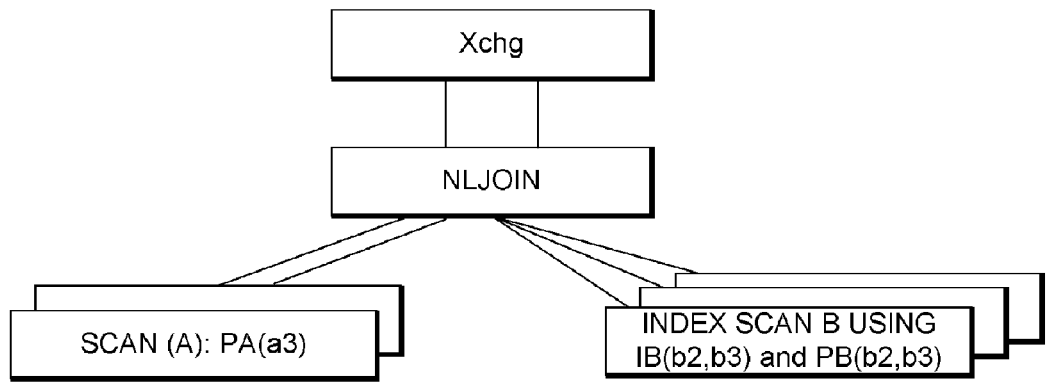

A third solution is to perform "dynamic partition elimination". For example, assume there are N partitions on the outer table and M partitions on the inner table. In this case, N threads from the outer can be used. Once a thread gets a tuple, it knows the joining predicate and hence can find out dynamically which partition of B to go to and only one partition of B will be chased. This is called "dynamic partition elimination" because non-qualifying partitions of the inner are eliminated for each row from the outer. The Xchg node in such a case is placed above the join node. FIG. 8D is a block diagram of an operator tree illustrating the dynamic partition elimination methodology of the present invention. One interesting thing to note in this case is that on the inner relation, each of the two outer threads will access one of the three partitions of the inner based on the joining attribute value on which it would evaluate the partitioning condition. Note that this gives rise to the partitioning of the outer relation as output from the join operator.

Figure 8E:
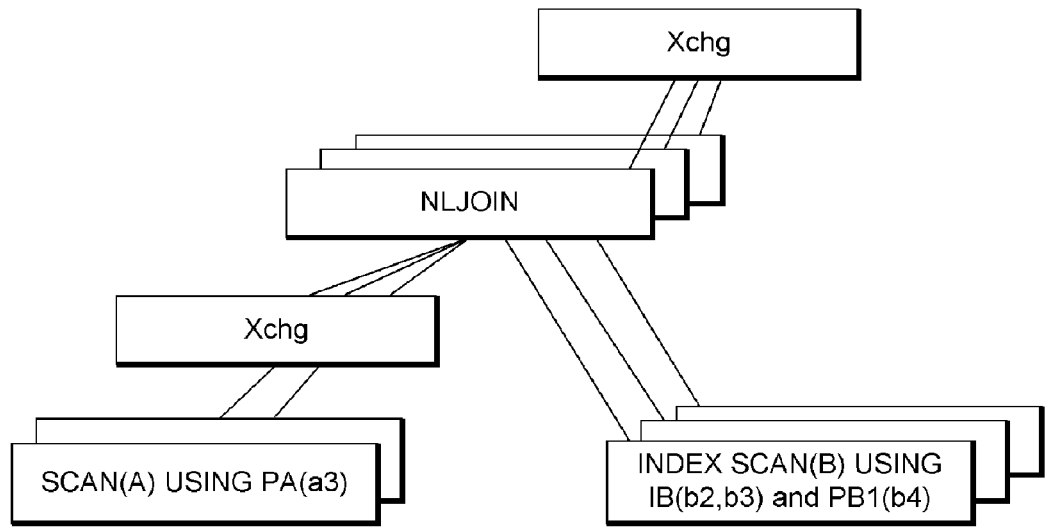

Partitioning on the right hand side operand does not match any of the join predicates, but the index on the right hand side is deemed useful. In other words, repartitioning the right hand side would be disadvantageous. For instance, assume that PB1 (b4) is the partitioning on B. FIG. 8E is an example of a outer replication nested loop join partitioning. In this outer replication nested loop join, the left hand side is replicated to each and every partition of B. At FIG. 8E the partition on A, PA(a3) is being replicated three ways. Thus, each of the two streams coming out of the scan is replicated to each of the three streams, that dips into the three partitions of B using the index IB. The join results in three streams coming out of the Xchg operator on top of NLJoin. As mentioned earlier, this strategy is used only if the table scanned is also a resultant table for update and delete, in which case it is not allowable to put an Xchg operator between the scanner and the update/delete operator. This is called "outer-replication" type partitioning because outer partitions are in effect being sent to each partition of the inner. If there are N threads on outer and M threads on inner, then each thread of M threads on inner will have no interference with another thread. One other thing to note is that one can propagate partitioning from inside, which means that the resultant stream is partitioned M ways. The downside of this strategy is that it requires the use of N+M threads.

Figure 8F:
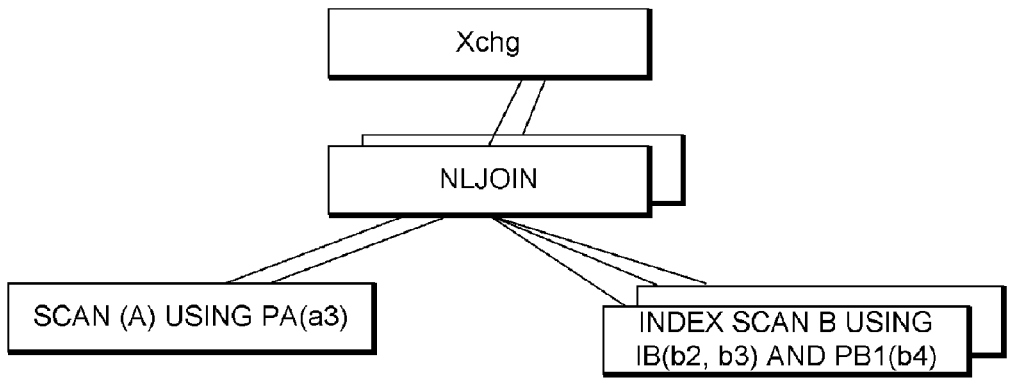

A second strategy involves the use of only N threads. Each of the N threads reads a partition of A and then reads the whole of B. Another way to view this is to say that the whole of B (including its partitions) will be replicated to each partition of the outer table A. This is referred to as "inner-replication" type partitioning. FIG. 8F is a block diagram of an operator tree illustrating inner replicated nested loop join partitioning. One advantage of the inner replication strategy is that only N threads are needed as opposed to N+M threads used by outer replication. Also, there is an overhead in replicating each and every row for outer replication which could be expensive. The downside of this strategy is that there is no pipelining between the scan of A and that of B, which are completely sequential for any given thread. Still, inner replication may be a good solution in many cases. Another item to note is that inner replication will allow the outer stream's partitioning to be propagated upstream, which can be interesting for some operators.

Figure 8G:
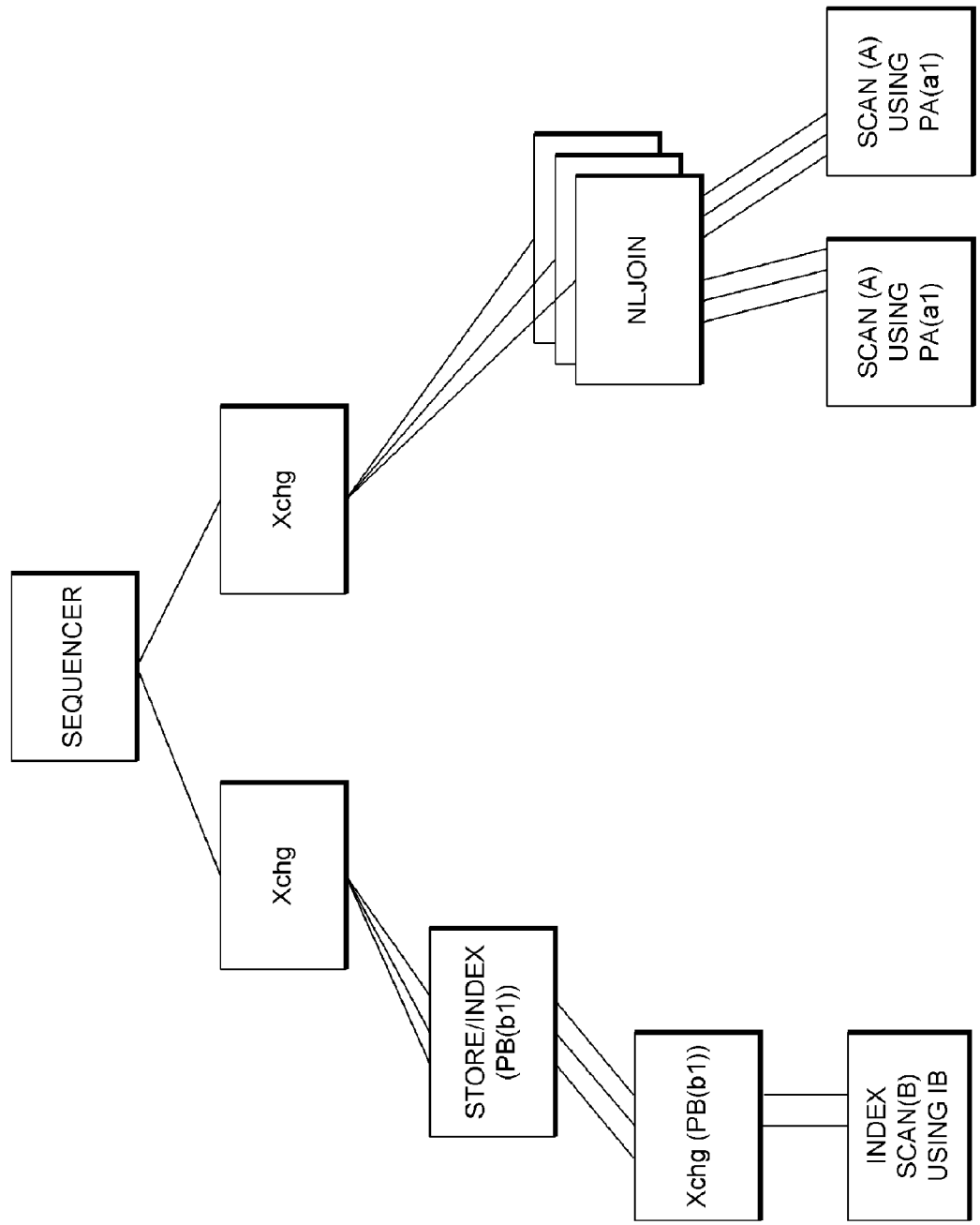

A third strategy is to reformat and repartition B if any of the left hand side partitioning attributes is a subset of the join predicate attributes, but the right hand side partitioning and index are useless. In this way one can avoid the left hand side table being repartitioned if it is huge. Reformatting and repartitioning the right hand side is deemed to be an expensive operation, but sometimes found to be a useful strategy which is known as "static repartitioning". The operator that does the reformatting and rebuilding of the index is called the Store-index. Consider the operator tree that results. For this example involving the same query, the partitioning on A is PA(a1) with three partitions and the partitioning on B is PB(b3) with two partitions. Also, IB(b3) is a local index on B. FIG. 8G is a block diagram of an operator tree illustrating a static repartitioning (or reformatting and repartitioning) strategy. As shown at FIG. 8G, since partial match occurs on A, B is reformatted and repartitioned. The partitioning of both operands is useless (i.e., none of the attributes on which the partitions are defined overlap with any of the join predicate). There are two possible solutions. With the use of an outer replicated strategy each partition of the outer relation is sent to each partition of inner relation. This is only done in case of update/delete with table joining to other tables. The other solution is to use an inner replicated strategy. It is to be noted that it appears that preferential treatment (the fact that the table on the inside is not readily repartitioned) is given to a relation on the inside. However, the approach is not biased as the outer relation will also end up at the inner slot for some possible join order.

Merge Join

Figure 9A:
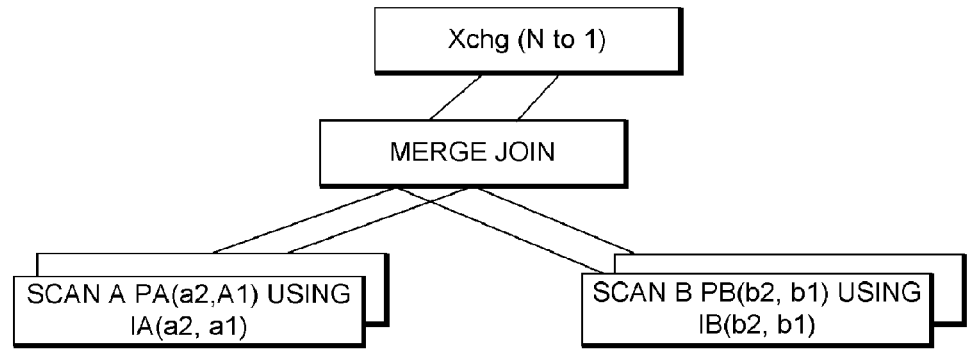

The strategies for implementing a parallel merge join are slightly different from those of a nested loop join because merge join needs a certain ordering on the join predicates, which causes some complications with the partitioning property. If both operands have the same partitioning and the attributes on which the partitioning is defined is a subset of the attributes in the join predicates, then additional repartitioning will not be required. The need for additional sort enforcers will depend on what ordering property is obtained. After a parallel merge join has been done, order preserving merges are possible for some cases of partitioning as discussed below. Consider some examples where sort enforcers will not have to be added, need to be added on one side, or need to be added on both sides. For purposes of this discussion, assume that the following query is received: "select * from A, B where a1=b1 and a2=b2". Initially assume that there is a partitioning PA(a2,a1) defined on table A with two partitions and PB(b2, b1) defined on table B with two partitions. Further, indices IA(a2,a1) and IB(b2,b1) exist on A and B respectively, which also have the same partitioning as the data-pages (i.e., these are local). The basic criterion is that the partitioning attributes and sort attributes precisely match the join predicates. FIG. 9A is a block diagram of an operator tree illustrating an equi-partitioned merge join. This illustrates how a case like this can be easily solved by doing a merge join without sort or partition enforcers.

In another example, take the same two tables, where indices are unpartitioned, such that one has IA(a2,a1) with data page partitioning of PA(a2) and IB(b2,b1) with data page partitioning of PB(b2). If the index is not local and is unpartitioned there are two possible solutions. The first is to do a 1 to N split of the ordered data stream into ordered partitioned streams and this will have to be generated from either side. The second solution is to do the merge join in serial. In the currently preferred embodiment of the present invention, both of these approaches are attempted and the cheaper of the two is selected.

Figure 9B:
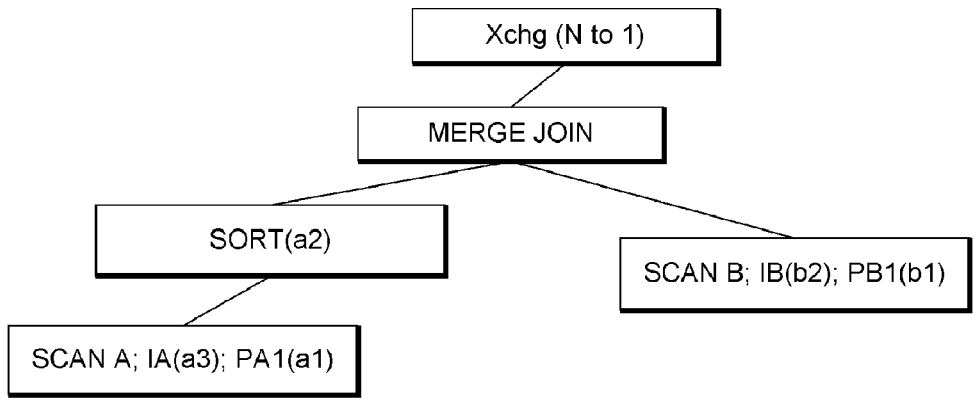

A slightly more complex case is where the index is partitioned not in accordance with the data page partitioning. For example, index IA(a2,a1) has a partitioning PA1 (a1) but the data page partitioning is PA(a2). Similarly, for table B the index IB(b2,b1) has a partitioning PB1 (b1), but the data pages are partitioned as PB(b2). This kind of global index will still be considered equi-partitioned and also gives the right ordering. However, the I/O isolation is somewhat dubious since each thread can interfere with another thread at the data partition level. Next, assume the same query with the same tables, where the index is local (i.e., has the same partitioning as the data). Further assume different indices for the table and, for the purpose of this example, that one index overlaps with the join predicate, but the other one does not. The indices are defined as follows: IA(a3) and IB(b2). In this case it is only necessary to sort A on a2. The orderings and partitioning are on different attributes of the relations, but a parallel merge join is still possible here. FIG. 9B is a block diagram illustrating an operator tree being partitioned with useful ordering. As can be seen from the above examples, partitioning is looked at first followed by the ordering. In the example illustrated at FIG. 9B, the partitioning matched but sort orderings had to be enforced. This is an important point as far as these two properties are concerned and all of the ordering/partitioning detection/enforcement methods will follow this scheme.

Figure 9C:
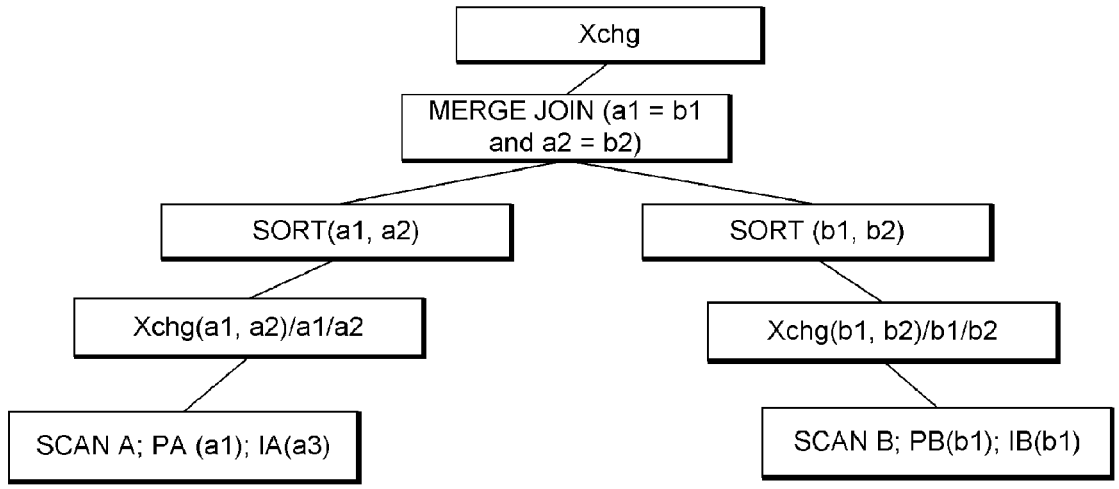

Referring back again to the previous case, it may be necessary to repartition both operands of the merge join operator in order to balance out the load. This repartitioning can cause the loss of the ordering. In order to illustrate this scenario, consider the same case used in the previous example: "select * from A, B where a1=b1 and a2=b2". As previously described, PA(a1) is partitioning defined on A and PB(b1) is partitioning defined on B. There is an index IA(a3) and index IB(b2). It is necessary to repartition for load balancing. The Xchg operator that handles the repartitioning of the scanned data can partition the data on any of the subset of the composite attributes as well as the full set of attributes from the join predicate. It needs to be analyzed to determine the best set of attributes to partition on. FIG. 9C is an operator tree diagram illustrating two level enforcers for a merge join. As shown, the partitioning for A may be done on attributes a1 or a2 or a composite of a1 and a2. Whatever partitioning is chosen for A, must also be matched on the side of B. Another thing to be noted is the fact that the sort enforcers are put on either side and the enforcement can be done on the complete join predicate, which means enforcing an ordering (a1,a2) on A and (b1,b2) on B.

If the operands have different partitioning, the scenario is not very different from the case previously discussed which called for repartitioning even though the partitioning was the same for both operands. The salient point here is that partitioning can be done as the first order of enforcement, and then sorting done within a given partition. The following rules are used to determine partitioning enforcement criterion:

1) Firstly, a check is made to determine if the partitioning attributes are a subset of the join predicate and that they are equal. If yes, then whether the partitioning criterion results in sufficiently load balanced partitions is examined. If the partitioning criterion does not result in sufficiently load balanced partitions, the one that is most appropriate is selected. This means that the partitioning on the selected side will be kept while repartitioning is done on the other side. Otherwise, repartitioning is performed on one or both sides. If PA(a1) is the partitioning on A and PB(b2) is the partitioning on B, either side could be chosen in the following example: "select a1,a2 from A,B where a1=b1 and a2=b2".

2) If repartitioning on one or both sides, chose any set of attributes that overlap the join predicate for repartitioning. If repartitioning is chosen on the scan of A, repartitioning is done on a2. If repartitioning is chosen on the scan of B, repartitioning is done on b1. In the case of both sides being repartitioned, the columns will be (a1,a2) and (b1, b2) on scans of tables A and B, respectively. Presumably, attributes on which some histogram information is available would be the prime candidates. The idea of selecting correct attributes for partitioning should come before load balancing and to be a subset of the attributes of the join predicate.

3) Cases involving N to M repartitioning, where N>1 and M>1, results in a loss of ordering, which means an additional sort enforcer is needed. Therefore, if a naturally occurring order is useful for the merge join, this should be considered even at the expense of bad partitioning. This may be an additional criterion for the initial case in which repartitioning could have worked on both sides.

4) As previously mentioned, repartitioning may result in a loss of ordering. But 1 to N repartitioning preserves the order, irrespective of the type of partitioning. If both sides have the right ordering, the incorrect partitioned streams can be merged and then joined. For instance, consider local indices IA(a1,a2) partitioned on a3 and IB(b1, b2) partitioned on b1. One could potentially merge both of the streams and use a merge join in serial, since the maximal ordering is available.

Figure 9D:
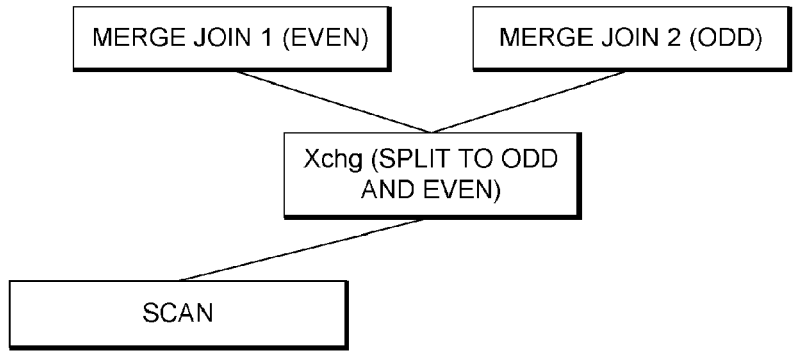
Figure 9E:
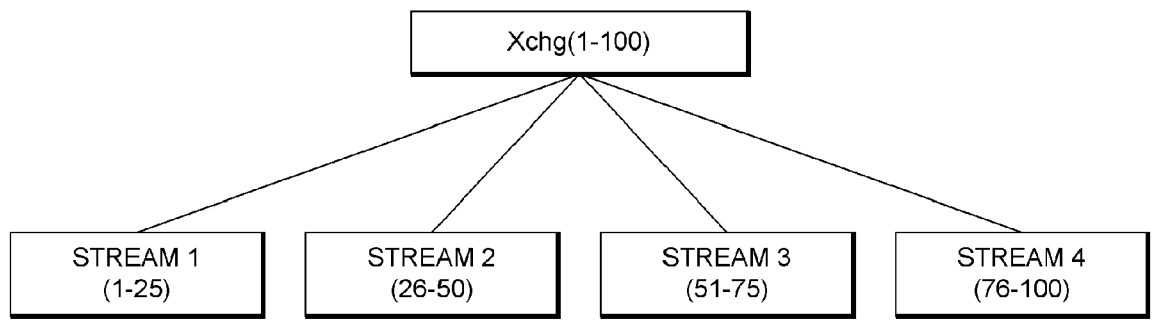

5) A N to 1 repartitioning (rather merge) is considered to be order preserving. For simple range partitioning this is a straightforward process. For a sorted hash partition, the merge may need an additional sorting that is not considered to be a sort enforcement. FIG. 9D is a block diagram of an operator tree illustrating a 1 to N partitioning (split) which will preserve its ordering. FIG. 9E is a block diagram of an operator tree illustrating an order preserving merge in which a N to 1 range partitioning is merged without losing the ordering. As shown at FIG. 9E, range partitioning is of considerable help in this situation.

Hash Joins

Figure 10A:
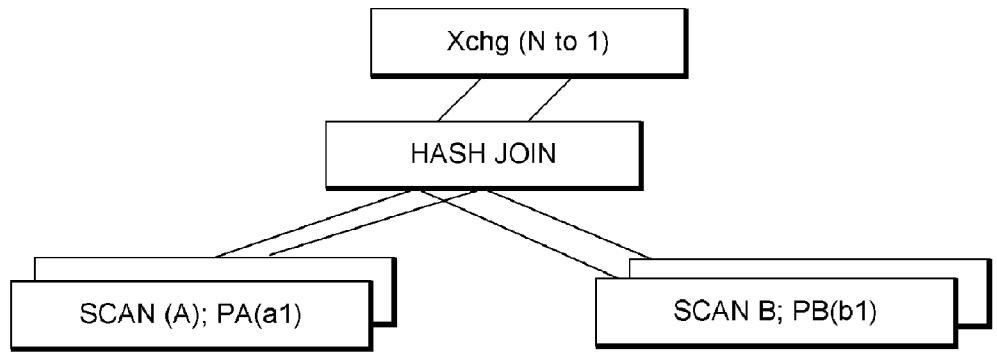
FIG. 10A is a block diagram of an operator tree showing a parallel hash join where both operands are equi-partitioned on the joining predicates.

With hash joins, there are three main conditions that need to be handled. The first involves operands which have the same partitioning as join predicates. As previously discussed, this is the simplest case. Assume that there are two tables A and B, that are partitioned on PA(a1) and PB(b1). The partitions are same and the query is as follows: "select * from A, B where a1=b1". In this case, no repartitioning is required and one can do a simple parallel hash join. FIG. 10A is a block diagram of an operator tree showing a parallel hash join where both operands are equi-partitioned on the joining predicates.

In the case where only one operand matches the join predicates, the operand whose partitioning does not match the joining predicate needs to be repartitioned to match that of the other partition. Assume table A has a partitioning PA(a1) and table B has a partitioning PB(b3) and the query is as follows: "select * from A, B where a1=b1 and a2=b2". In this case the optimizer will repartition either table B on column b1 or it will partition both sides on columns (a1,a2) and (b1, b2) for load balancing.

Figure 10B:
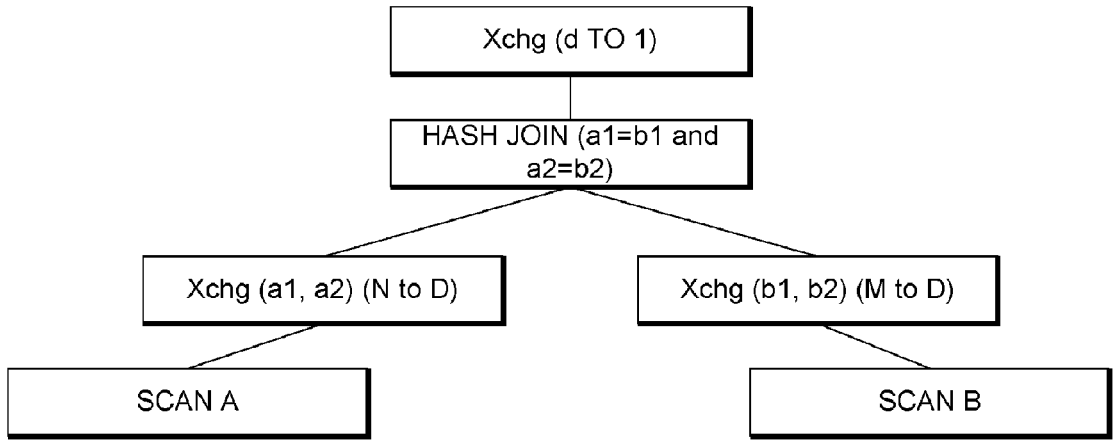
FIG. 10B is a block diagram of an operator tree showing both sides of a hash join being repartitioned.

The third case is when operands match different parts of the join predicates. In this event, each of the partitioning matches part of the joining predicate, but does not match each other. Let us take an example where tables A and B are partitioned on PA(a1) and PB(b2) and the query is: "select * from A, B where a1=b1 and a2=b2". Both partitions do have a match with the joining predicates, but their partitioning is not same, as columns a1 and b2 do not join. Hence, one or both sides need to be repartitioned on the joining predicates. FIG. 10B is a block diagram of an operator tree showing both sides of a hash join being repartitioned. If only table A is to be repartitioned, it can be done on a2 and similarly, if B needs to be repartitioned, it can be done on b1. If none matches the join predicates, both sides of the hash join need to be repartitioned.

Scalar Aggregates

Figure 10C:
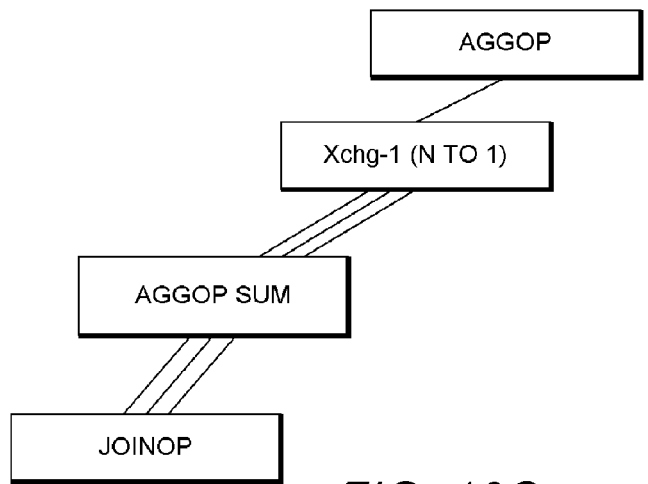
FIG. 10C is a block diagram illustrating an example of a scalar aggregate with an N to 1 merge.
Figure 10D:
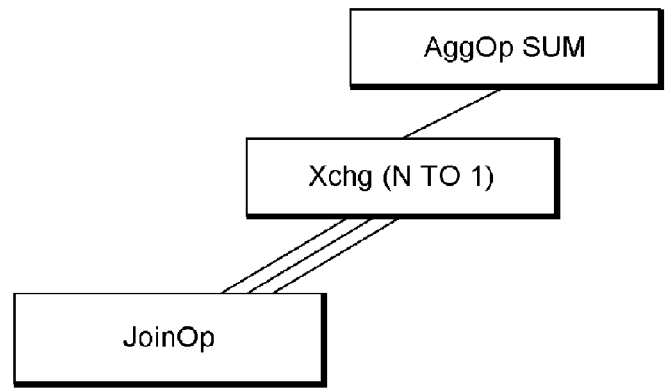
FIG. 10D is a block diagram illustrating an example of a serial aggregation preceded by an N to 1 merge.

Scalar aggregates are an important candidate for parallel operation. The basic strategy behind them is to divide the operator's data into multiple parts, invoke the aggregates in parallel, and then have another step that combines the results back. In the currently preferred embodiment of the present invention, a separate scalar aggregation operator is used to provide the final merged results. As far as the partitioning rules are concerned any balanced partitioning stream can be aggregated as shown in an example with the following query: "select count(a1) from A, B". During optimization, the actual expansion of an aggregate operator to two aggregate operators will be performed. The first level of aggregation has a special physical property indicating that the aggregation is incomplete. This will indicate that the optimizer should not prune other aggregation operations that are complete but more expensive. FIG. 10C is a block diagram illustrating an example of a scalar aggregate with an N to 1 merge. As shown, one can notice that the join operator is being executed via N clones. The aggregation operator also works on each of the N streams. An important thing to note is that the Xchg-1 will only have a single piece of data (since the result of the first stage of an aggregation is a scalar) in each of its pipes that will get sent to the node above. The optimizer can provide some hints to the pipe manager during execution time to use minimal resource for such pipes. The top aggregate operator then aggregates the merged stream. It is also possible to repartition N streams to 1 and then apply the aggregation operator on it. FIG. 10D is a block diagram illustrating an example of a serial aggregation preceded by an N to 1 merge. As shown at FIG. 10D, a different operator tree results with the same example query.

Another interesting method is to actually list the possible transformation on aggregates, when a two level aggregation is done. For example: "Select sum(a1) from A" is translated to "select sum(sum(a1)) from A". Each aggregate function has the first level aggregate and the second level aggregate separated by an Xchg operator, which should be a N to 1 data constrictor. Accordingly, "select count(a1) from A" is translated to "select sum(count(a1)) from A". When dealing with the max/min aggregate as in the following example, "select max(a1), min(a2) from A" is translated to "select max(max (a1)), min(min(a2) from A". When dealing with the max/min aggregate as in the example below "select max(a1), min(a2) from A" will be translated to "select max(max(a1)), min(min (a2) from A".

There are some optimizations that can be done in cases involving range partitioning. The MAX aggregation can be applied to the partition housing the highest ranged partition and partition elimination can be applied for all other partitions. It is even possible to push down such partition elimination below a join if the MAX aggregation is done over a join. A similar concept also applies to MIN aggregate, where the least valued partition can be used for aggregation. Another side effect of such an operation is that it is not necessary to perform two levels of aggregation as would be the case in a naive strategy. Dealing with average aggregate operator is somewhat more interesting. In the currently preferred embodiment of the present invention, average aggregation breaks down into two aggregate operators: sum and count. Hence, this poses no special problem in query optimization.

Vector Aggregates

Figure 10E:
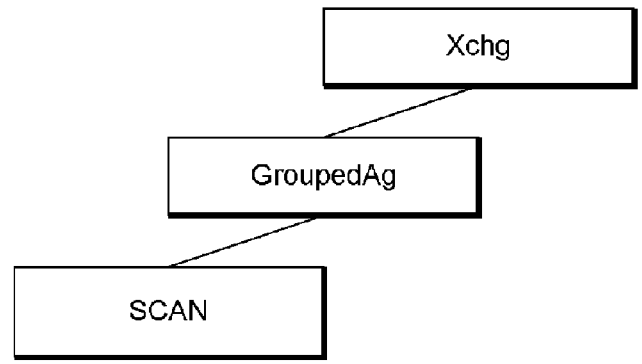
FIG. 10E is a block diagram illustrating a parallel vector aggregation of an example query.

Vector aggregates provide a slightly more complex scenario in the partitioning process. This is due to the fact that a vector aggregate has a group by clause. There are several cases that arise from different kinds of partitioning and vector aggregates. The attributes in the group by clause match exactly with the attributes on which the data stream is partitioned. In this case vector aggregation can be done without any problem and the resultant stream merged under an Xchg operator. An important point to note is that no two streams will contain the same group by attribute values. Consider the following example with PA(a3,a2) as a partition defined on A: "select count(a1), a2, a3 from A group by a2,a3". The example has been taken with the partition attributes being in reverse order with respect to the attributes in group by clause. This is perfectly fine, since the attribute in the by list of a vector aggregate is semantically unordered. FIG. 10E is a block diagram illustrating a parallel vector aggregation of a query (e.g., the above example query). Now consider another example where the attributes in the group by clause partially overlap the attributes used for partitioning. In this particular instance, assume that this is a case where a partitioning is defined on attributes that form a proper subset of the attributes used for the group-by clause. For example, PA(a1) is a partitioning (range or hash) defined for table A. This means that a given value of a1 can occur only in one partition. Hence, any combination of attributes that include a1 can have a unique value set in only one partition. Thus, a single level of grouped aggregation will suffice in this case.

Figure 10F:
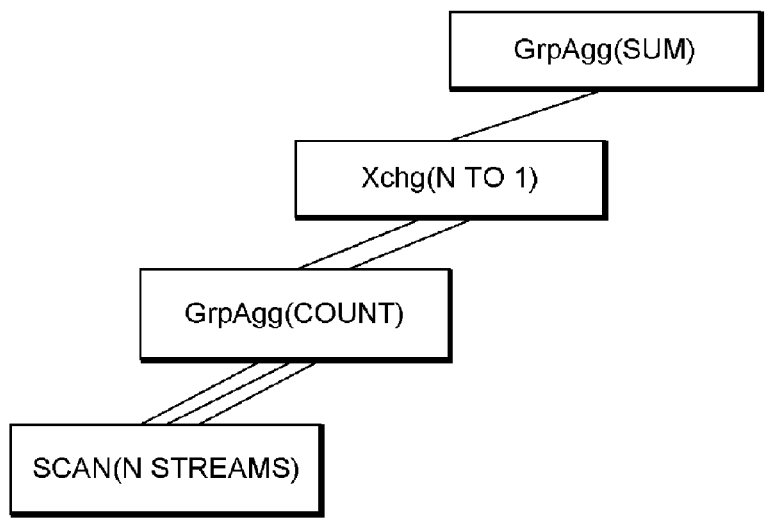
FIG. 10F is a block diagram of an operator tree illustrating a centralized two phase aggregation approach.

Next, assume a case where a partitioning is defined on a superset of the attributes used in the group by clause (i.e., the partition is on (a2,a3,a1)). If this partition turns out to be a hash partition, then there is every chance that the attribute a1 can contribute a different value, whereby the same pair of attribute values for (a2,a3) may now occur in two different partitions. So, without losing generality, it is probably correct to assume that hash partitioning on any superset of group by clause attributes will cause the same group to occur into two different partitions, and may need the presence of a second level vector aggregation as discussed below. FIG. 10F is a block diagram of an operator tree illustrating the "centralized two phase aggregation" approach. Unfortunately, such an approach does not scale very well since the final level of aggregation is serial in nature and becomes a bottleneck.

The transformations required for a centralized two-phase aggregation are exactly the same as was shown for the scalar aggregation. However, if the same partitioning is of the type range instead of hash, then if any subset of the group by attributes in the group by clause forms a proper prefix of the partitioning attributes, the same group must occur in an identifiable partition. The following example will provide further explanation of this statement. Assume the same query as in the immediately prior example and a range partitioning on a2, a4. In this case every unique value of a2 will fall in only some known partitions. For example, the following ranges for (a2, a4). A2 range: 1 Stream: 1-1; 2 Streams: 1-1; 3 Streams: 1-2; 4 Streams: 2-3; 5 Streams: 3-infinity. A4 range: 1 Stream: 10-80; 2 Streams: 80-200; 3 Streams: 200-100; 4 Streams: 100-70; 5 Streams: 70-infinity.

The above example shows that a distinct value of a2 will occur among preset streams (i.e., it can occur amongst 1, 2 and 3; 2 and 3; and finally 4 and 5). However, assume range partitioning is on a1, a2 and partitioning is defined as follows: PA is a partition such that the partitions PA-1(1<=a1<100, 1<=a2<200) PA2(1<=a1<100, 201<=a2<400), PA-3 (100<=a1<200, 1<=a2<200). It can be observed that a value of a2=125 will occur both in partitions PA-1 and PA-3 and hence two levels of aggregation (i.e., a centralized two phase aggregation approach) will be needed. For the most part, the transformations are same as that of the scalar aggregates. Having established the minimal condition required to ensure that no two clones of a group by clause get the same grouped values, other ways to deal with vector aggregates will next be discussed. The condition established will be referred to as the minimal partitioning criterion.

Figure 11A:
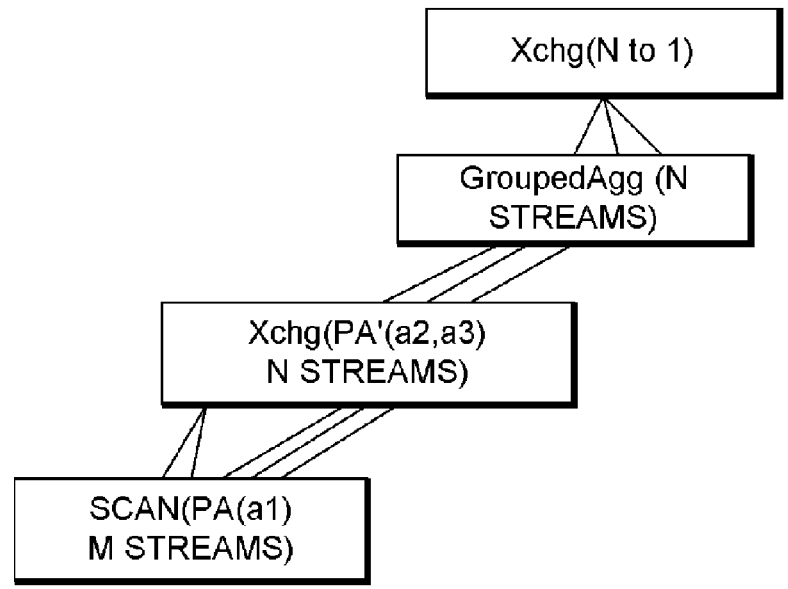
FIG. 11A is a block diagram illustrating an example of grouped aggregation with minimal partitioning.

Now consider a case where partitioning is useless unless a two level aggregation needs to be done. However, another strategy can be applied in which the data stream is partitioned before applying first level aggregation followed by a merge. Semantically, a minimal partitioning condition can be applied, which is same as the cases described above for avoiding two levels of aggregation. The chief consideration here is load balancing. Two level partitioning may be good provided first level aggregation allows for a large reduction in cardinality, but this is subjected to how good projection cardinality estimates are, which can be a hard problem to solve. Referring back to the repartitioning case, the data stream needs to be minimally repartitioned on any subset of the attributes used in the group by clause. FIG. 11A is a block diagram illustrating an example of grouped aggregation with minimal partitioning. This example assumes the above query with the table having a partition PA (a1).

Figure 11B:
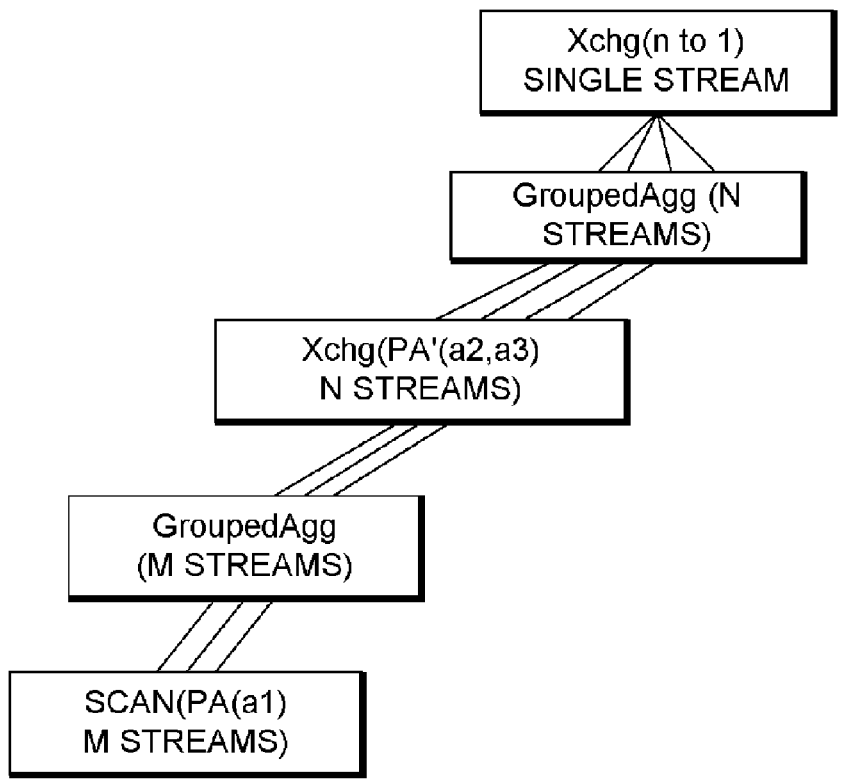
FIG. 11B is a block diagram of an operator tree illustrating a de-centralized two phase aggregation approach.

There is still another alternative, which is referred to as the "de-centralized two phase aggregation" approach. In this scenario, the merge phase as observed for its serial nature in the centralized two phase approach is parallelized by partitioning the partially grouped data stream on any attribute of the group by clause (minimal partitioning criterion), to ensure that no further aggregation is required. The success of this strategy, like the one mentioned before, depends on the effectiveness of the duplicate reduction for the data set. Apart from the fact that this strategy allows for less expensive repartitioning and the ability to parallelize the merge, it can also use the second repartitioning to use more resources for a short burst. FIG. 11B is a block diagram of an operator tree illustrating the de-centralized two-phase aggregation approach.

Distinct Queries

A distinct query on a set of columns can be thought of as having a group by operation on the columns on which distinct is wanted without the aggregate operation. For example "select distinct a1, a2 from A" is similar to "select a1, a2 from A group by a1, a2". Thus, most of the discussion above in this document is also applicable to distincts (distinct queries). Once again, if the partitioning keys is a subset of the columns on which distinctness is wanted, then one can apply a hash based distinct or a sort based distinct in parallel followed by a N to 1 Xchg over it.

Another alternative for distinct queries is to serialize the data stream by putting in a N to 1 Xchg and performing the distinct operation in serial. The problem becomes more difficult as with vector aggregates when the columns on which distinctness is wanted is not a superset of the partitioning keys. In this case, one could either serialize the data stream as mentioned before and then perform the distinct, or one could re-partition the data stream on the columns on which distinctness is wanted. The distinct will then be performed in parallel with a N to 1 Xchg over it. This is very similar to that shown in FIG. 11A with the GroupedAgg operator replaced by a HashDistinct operator, where HashDistinct operator enforces distinctness using a hash based strategy on the columns on which distinctness is required.

The same technique described above for a vector aggregation which had two phase aggregation can also be extended to distinct queries when the partitioning keys are not a subset of the columns for which distinctness is needed. In the first phase, the distinct operation can be applied to the data and then the result of that operation can be merged using a N to 1 Xchg followed by a second level distinct operation. This would look similar to that shown in FIG. 10F, with the GroupedAgg replaced with a HashDistinct operator. As previously described, this has the disadvantage of having to perform a serial distinct operation which ultimately could be a bottleneck for parallel performance.

In a case where the partitioning keys are not a subset of the columns on which distinctness is required the above-described "Decentralized two Phase Aggregation" could be used. In this case, the distinct operation is applied in parallel on the input stream, followed by a re-partitioning of the partially applied "distinct" using the columns on which distinct is needed. A second level distinct operation is then applied and is topped with a N to 1 Xchg over it. This has the advantages of being able to remove the bottleneck as previously discussed.

Subqueries (in Conjunction with Filters)

Subqueries are especially complex operators to parallelize and limited parallel strategies are applied to subqueries in the currently preferred embodiment of the present invention. In the system's execution architecture, subqueries are handled under filter operators, while in the optimizer subqueries are handled as generic tables. However, no matter how they are modeled in the optimizer and execution engines, the basic partitioning property remains key to achieve parallelism. Broadly, subqueries can be classified into two groups: quantified predicate subqueries; and expression subqueries. Quantified predicate subqueries are ones that have a predicate as [NOT] IN, [NOT]EXISTS[, <, <=],=, !=, >, >=,<,<=] ANY/ALL. In general, such subqueries are processed using a set of internal guidelines. For purposes of the following discussion, some parallelism specific issues are highlighted using IN/EXISTS subquery examples. An IN/EXISTS subquery will not be converted to a semi join, if the subquery is under a disjunctive predicate, but if it will be flattened to a semi join otherwise. Thus, there are some additional issues that need to be examined.

IN/EXISTS subquery that can be converted to semi joins: For any semi join, all existing join strategies will work without modification. The only strategies that are difficult to work with are the replicated join strategies. In case of a replicated join, each tuple from a given partition on the outer operand will be sent to every partition of the inner operand, which means that if the same tuple encounters a match in more than one partition, only one of them needs to be selected. This can only be done using a delta project type of strategy, where a SORT enforcer will have to be placed on top of the join operator. This is almost like using delta project to transform a semi-join to a join operator and hence it is meaningless to try this as a partitioning strategy. This is illustrated by the following example with PA(a1) as the partitioning on A, PB(b2) as the partitioning on B and the below query: "select a1,a2 from A where a1 in (select b1 from B)". For purposes of this discussion, assume that PA is such that it splits A into two streams: odd and even. Since both the streams will have to be sent to B, it can match an odd value in one or more partitions of B, but the semantics of the query requires it to qualify a row from A not more than once. Thus, an additional operation (presumably duplicate elimination using sort or hash) will be needed to enforce it and hence the optimizer will not consider this a viable strategy. However, if there is a valid partitioning defined on the joining attributes (correlated join) or any subset of it, the optimizer will consider it as a viable strategy. Now, there is some of a flexibility because every value of b1 (no matter what) will only be located in one partition of B. Accordingly, no matter what value qualifies in whichever partition, it is sufficient to know that they will qualify in only one partition. Consider now a case in which the above query is modified as follows: "select a1, a3 from A where exists (select b4 from B where A.a1=b1 and A.a2=b2)". In this case, PA(a3) is a range partition on A and PB(b1) is a hash partition on B. The fact that each value of a1 even when sent to all partitions of B, will qualify only in one partition, makes it appear that this will work correctly. Although a replicated join will work in a limited case it is not used in the currently preferred embodiment of the present invention.

Figure 12A:
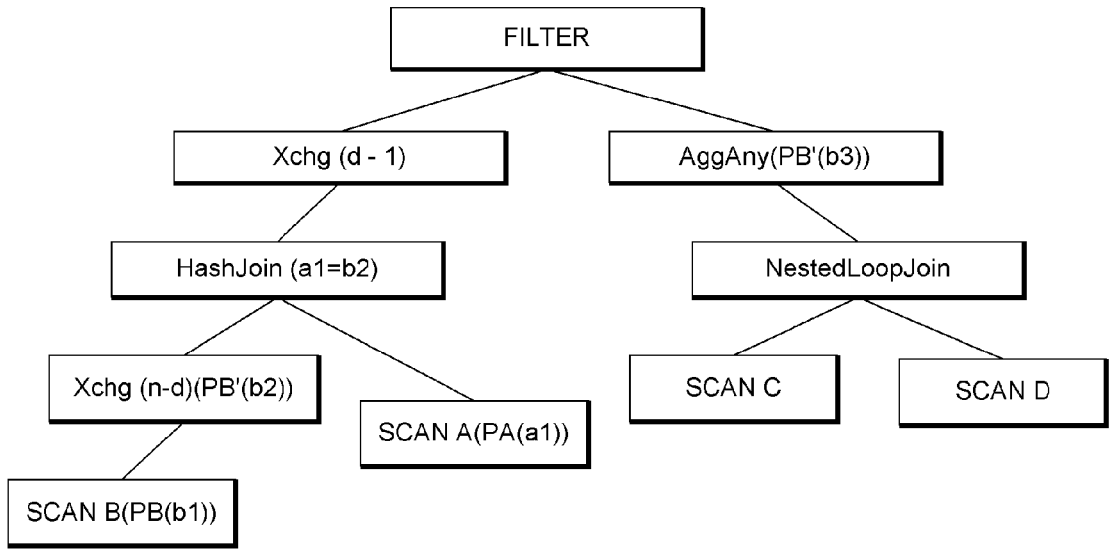
FIG. 12A is a block diagram of an operator tree showing an example of correlated subquery processing.

In case a subquery cannot be flattened, then all tables within the subquery will be accessed in serial. Any correlated table from outer query block will be serialized before dipping into a subquery block. This is illustrated by the following example in which tables A, B, C and D are partitioned as PA(a1), PB(b1), PC(c2) and PD(d3) respectively and the query is: "select * from A, B where a1=b2 and not exists (select 1 from C, D where B.b1=c2 and c2=d3)". This is an interesting query having a subquery which cannot be flattened. FIG. 12A is a block diagram of an operator tree showing an example of correlated subquery processing. Since the query optimization happens inside out, tables C and D are joined in a serial mode, although one can see that they have useful partitioning with respect to the joining predicate c2=d3. The join and the scan access to the tables is done in serial. Now, the tables A and B in the outer query block can be joined in parallel and then joined with the subquery in serial. As can be seen the partitioning on table B is not useful with respect to the joining predicate a1=b2 and hence will be repartitioned to match that of A and then the join done in parallel. It will then serialize its stream using a N to 1 Xchg operator before accessing the subquery.

Set Operators—Unions/Intersections

The following discussion is focused on the Union operator only, since that is the only set operator that is implemented in the currently preferred embodiment of the present invention. A Union operator is evaluated as a UnionAll followed by some duplicate remover (sort or hash-based distinct). In the actual implementation, this is done by a single operator, which does the union and duplicate removal. A Union operator is a n-ary operator which can have any number of children under it. The best scenario is one with the same partitioning on each side of the Union (i.e., where all sides of a Union will have the same partitioning). Consider, for example, PA(a2) as a partition on table A, PB(b2) as an identical partitioning on B and the below query: "select a1, a2 from A UNION select b1, b2 from B". The same partitioning results in the output stream. One thing to note is that if the partitioning PB is on b1 instead, then the two partitions will be deemed incompatible. Logically, the attributes in the select list of each side of the Union get a positioning assigned to them, which signifies that a derived table from a Union data stream will have a1,b1 contributing to its first attribute and a2,b2 contributing to the second attribute. The partitioning on each side of the operands must be equi-partitioned with respect to the positional equivalence of columns in its select list. For the example above, the tables A and B can be equi-partitioned on (a1,a2) and (b1, b2) or (a1, b1) or (a2, b2).

Figure 12B:
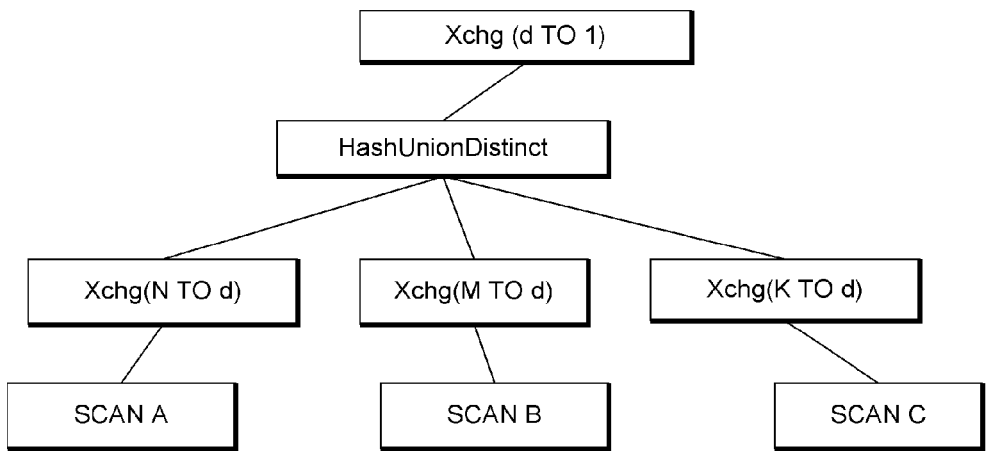
FIG. 12B is a block diagram of an operator tree illustrating repartitioning of operands to perform a parallel hash based union.

In the case operands have different partitions, which means the partitioning is not on the right attributes or the degrees do not match, then either the streams will have to be serialized by putting an Xchg operator below it and serializing the union operation. Alternately, each of the operands can be repartitioned and then the union operation is done in parallel. FIG. 12B is a block diagram of an operator tree illustrating repartitioning of operands to perform a parallel hash based union. Union All operators do not need any semantic based partitioning. The degree of each of the operands needs to be the same to simplify the execution mechanism.

Sorts for Order by

Parallelism for producing an ordered stream is slightly more complicated. In general, an ordered stream that does not need any inter-ordering between the streams suffice for algorithms dealing with parallel joins and the like. Hence, parallel sorts can be applied as long as there exists a partitioning condition on the subset of the attributes required for ordering. For parallel orderbys, partitioning is based on the columns in the orderby list. For instance, assume a partitioning on table A called PA(a1) and a local index IA(a2,a3) with the query in question as: "select a2, a3 from A where a2>10 order by a2, a3". If the local index is used, then the index scan can be done in parallel with a N to 1 Xchg operator above the scan to do an order preserving merge. This is attempted irrespective of what type of partitioning is available. If there is no local index, the sort is attempted above the scan and then the Xchg operator applied over it.

Another case, where the partitioning may be useful is for an M to 1 merge of ordered streams. If for any M way merge, the streams are ordered according to range partitioning, the final ordering process is a simple matter of sequencing the streams. There are some cases where a M to N way repartitioning can also be order preserving. Consider the following four ordered streams, which get repartitioned to two streams: ordered odd numbers and ordered even numbers. One can keep the ordering in output streams if each of the output stream uses an order preserving merge. In this case assume four input streams on the same partitioning key are partitioned as mod 4=0, mod 4=2, mod 4=1 and mod 4=3. The repartition can simply merge the first and second stream since that would give rise to even key value stream and the other two for odd key value stream. Similarly, the same thing holds when repartitioning a data stream, where an odd stream is split two ways and an even stream is also split two ways. If the destination stream does not receive from more than one source such repartitioning is order preserving by itself.

When repartitioning a data stream for sort, it is useful to partition it by ranges rather than by hashing if some statistics are available on the partitioning attributes. Note that for range partitioning, currently the first attribute of the partitioning keys is used. Otherwise, the system resorts to hash based repartitioning.

Semantic-Based Partitioning Operations During Query Processing

Figure 13A:
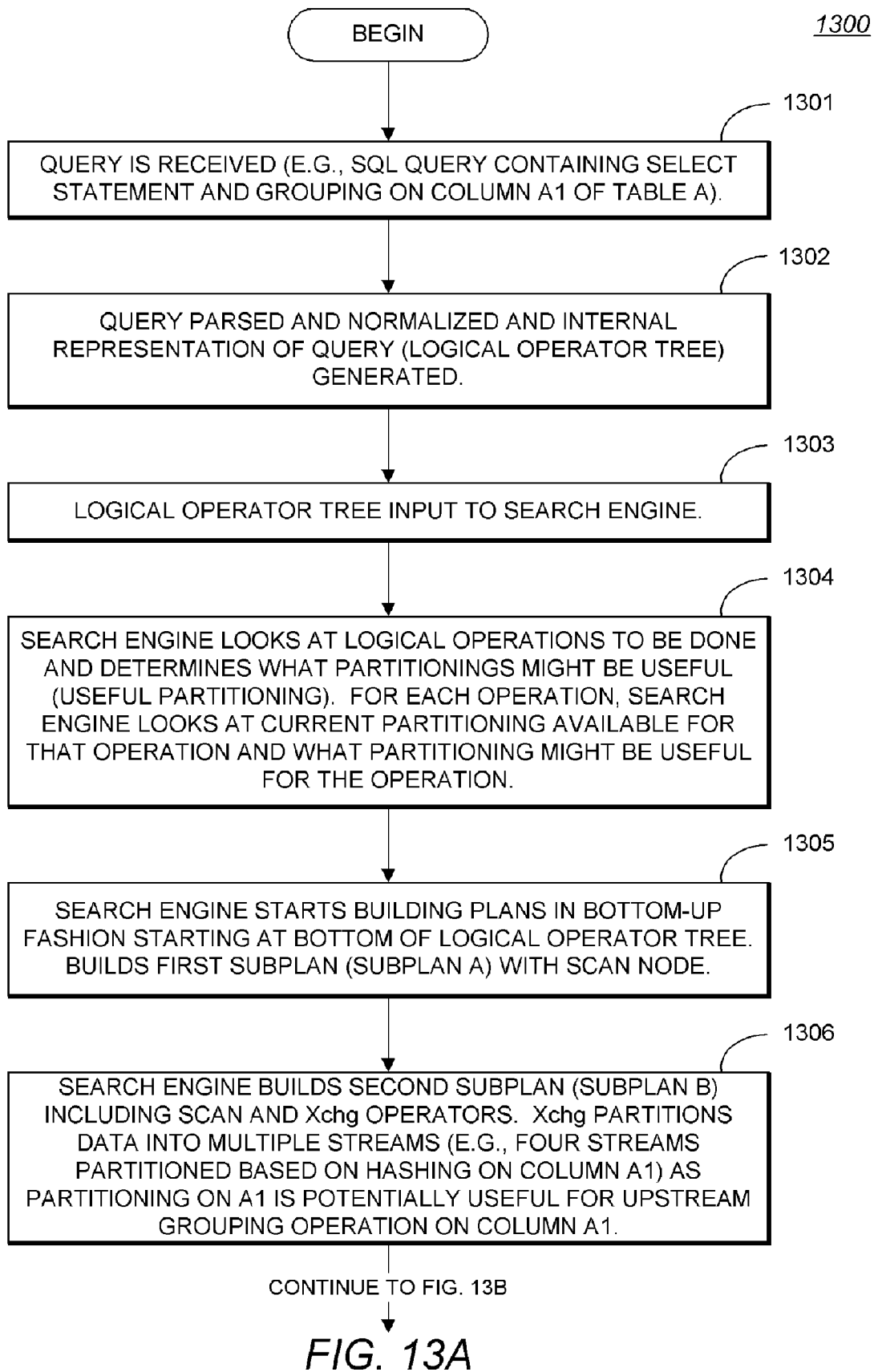
FIGS. 13A-B comprise a single flowchart illustrating the method steps of the operations of the present invention for semantic-based partitioning in query optimization.
Figure 13B:
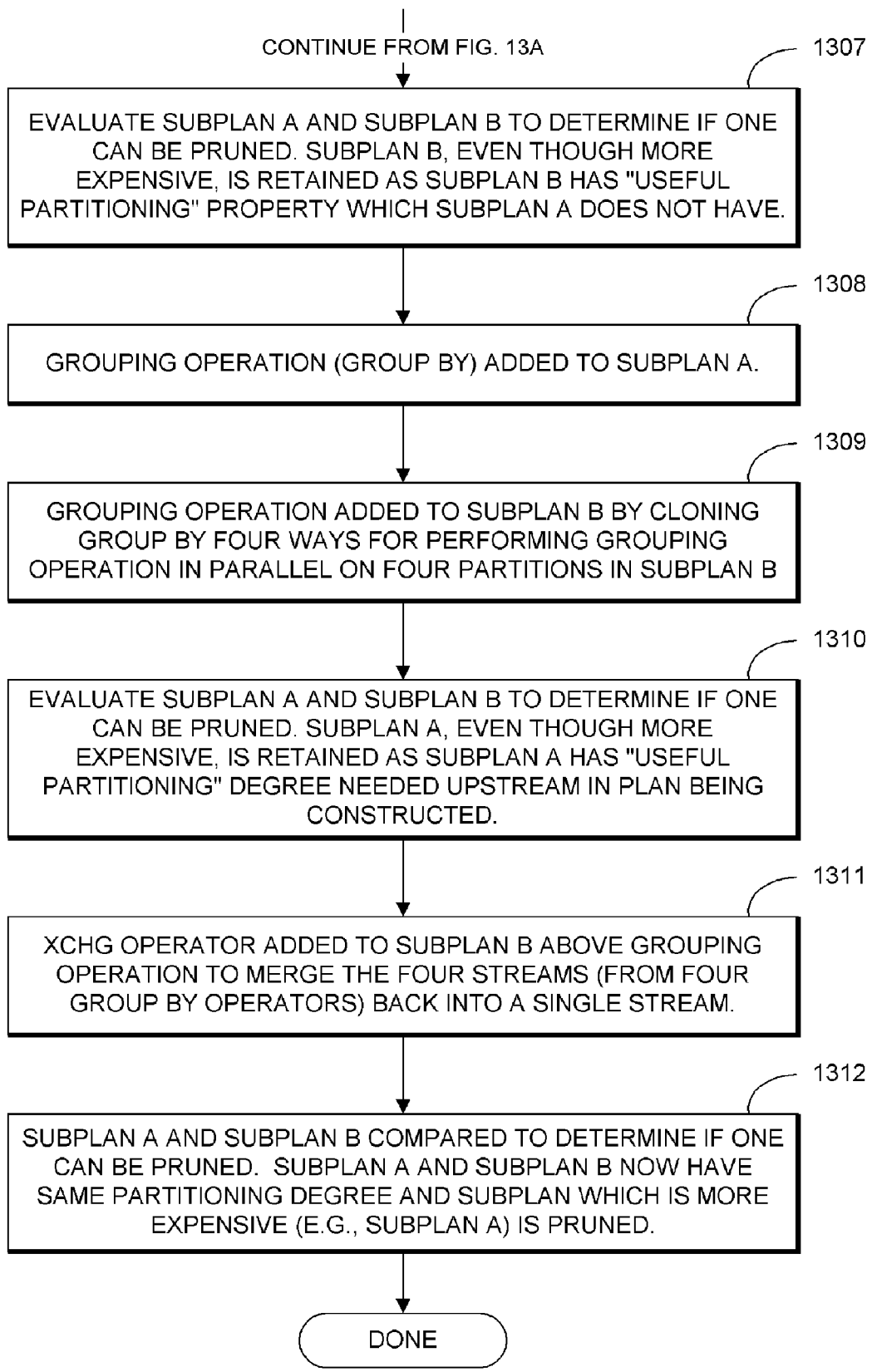

FIGS. 13A-B comprise a single flowchart 1300 illustrating the method steps of the operations of the present invention for semantic-based partitioning in query optimization. In the following discussion, a SQL query containing a GROUP By clause is used an example to illustrate the operations of the present invention. However, the methodology of the present invention is also useful for optimization of a wide range of queries and is not limited to use in this context. In addition, the currently preferred embodiment of the present invention uses a bottom-up, depth-first search engine. However, the system and methodology of the present invention may also be used with other types of search engines. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

As shown, the method commences with the receipt of a query (e.g., an SQL query) at step 1301. The query may, for example, contain a SELECT statement on a table A with a grouping (GROUP BY) on column A1 as follows:

SELECT COUNT (*), A1
  FROM A
  GROUP BY A1

At step 1302, the query is parsed and normalized and an internal representation of the query is generated as a logical operator tree. The logical operator tree is a tree whose nodes are pure logical relational algebra operators, such as Join, Group, and Union for example. Physical operators such as Nested Loops Join and Merge Join are not pure logical relational algebra operators and are not included in the logical operator tree. For example, in case of a simple query involving a scalar aggregation such as Select Count * from A, a simple logical operator tree would have two nodes: the first being a Scan and the second being a scalar aggregation. However, the actual physical scan operator that would be used for executing the query (e.g., Table scan, Index scan, etc.) would not be determined at this point in the process. Rather, the Scan node is a logical operator. Similarly, although there may only be one way to perform a scalar aggregation, at this point in the optimization process it is similarly structured as a logical operator. In other words, the operator tree is a tree of logical operators and does not yet include the actual physical operators that will eventually be selected to execute the queries.

At step 1303, the logical operator tree is input to the optimizer search engine. In the currently preferred embodiment of the present invention, the optimizer search engine operates in a bottom-up fashion. Before starting to build plans for executing the query in a bottom-up fashion, the search engine looks at the logical operations that need to be done and determines what partitionings might be useful (useful partitioning) at step 1304. The optimizer has a notion of "useful partitioning" which is similar to the concept of "interesting orders" in the context of ordering. For instance, the above example query has a grouping on column A1. Even if there is no partitioning coming from the Scan of table A (i.e., table A is unpartitioned), the fact that column A1 is useful for an upstream operation (e.g., the grouping operation) is recorded by the optimizer prior to plan generation. Similarly, for a query including a join, the join predicate is tracked as it may be something that is useful for an upstream operation.

The optimizer search engine commences inspection of the search space of possible plans and plan fragments (referred to as subplans or partial plans) in order to determine the most cost effective query execution plan. During search space inspection, the search engine builds alternative plans and subplans in a bottom-up fashion. The plans and subplans for an equivalence class compete with each other to be part of the final plan to be used to execute the query. This involves transforming the initial logical operator tree into a physical operator tree, including reordering expressions using algebraic rules, replacing logical operators with physical operators that implement them, and enforcing the properties needed by some algorithms. The following discussion will described these operations for the above example query. At step 1305, the optimizer starts the process of building the plan starting at the bottom of the logical operator tree by building a first subplan (Subplan A) having a Scan node. For each operation, the search engine looks at the current partitioning that is available for that operation. For a Scan of an unpartitioned table, the partitioning that is available might include round-robin partitioning of degree one (1). After evaluating the current partitioning and the operation, the search engine also looks at what partitioning might be useful for other operations that are to be performed upstream in the plan. The notion of what partitioning is useful has already been pre-computed as described above. In this example involving a grouping on column A1, a partitioning on A1 is potentially useful for the upstream grouping operation. In addition, a serial stream that is a partitioning of degree 1 will also be useful since this is what the client expects. Accordingly, a second subplan (Subplan B) which includes an Xchg operator for partitioning the Scan into multiple streams (e.g., four streams which are partitioned based on a hashing on column A1 as previously described) is generated at step 1306. At step 1307, the optimizer evaluates the two Subplans. Subplan A has only a Scan node and Subplan B has a Scan node plus an Xchg iterator for partitioning the data. As Subplan B including the Xchg is performing additional operations, it has a cost higher than that of the partial plan having only the Scan. However, as Subplan B provides a "useful partitioning" the optimizer does not prune Subplan B. Generally, the optimizer only prunes a plan (or subplan) if it is more expensive than another plan (or subplan) and does not have any useful properties (e.g., useful partitioning) that are stronger than that of the other plan. In this case, both subplans provide a useful property, but one cannot say for sure if one is stronger than the other. Accordingly, the optimizer retains the partial plan having the "useful partitioning" property in the plan cache even though its execution cost is greater than the first partial plan. When the optimizer compares two partial plans (e.g., Subplan A and Subplan B), it will prune Subplan B if Subplan B is more expensive than Subplan A, AND the useful properties of Subplan B are the same or weaker than those of Subplan A. However, in this case Subplan B has a useful property (i.e., a useful partitioning property) that Subplan A does not have. Thus, the optimizer will retain both Subplan A and Subplan B for future consideration as at this point in the optimization process it cannot yet determine which will be more efficient as part of the overall plan for execution of the query.

At step 1308, the optimizer will apply (add) a grouping operation (GROUP BY) to Subplan A. At step 1309, the grouping operation is added to Subplan B. As previously described, for Subplan B the GROUP BY operator is cloned four ways so that the grouping operation can be performed in parallel on the four partitions. After the grouping operation is added to both Subplans, the two Subplans are evaluated to determine if one of them can be pruned as provided at step 1310. During this evaluation, the partitioning degree of the Group By operator is considered. In this example, Subplan A has a partitioning of degree one, while Subplan B has a partitioning degree of four. When the two partial plans are compared, the cost of Subplan B which has a Group By operation with a partitioning degree of four is likely to be considerably less than Subplan A which has a partitioning degree of one. For purposes of the following discussion, assume this is the case and that Subplan B is less expensive. However, the optimizer also considers whether either of these plans has a useful property. More particularly, the optimizer evaluates whether the partitioning of each of the Subplans is useful upstream in the plan that is being constructed. In this case, the partitioning of Subplan B is not useful upstream. The partitioning that is useful upstream is a partitioning degree of one as that is what the client wants to receive (i.e., a single stream). At this point in the optimization process, Subplan A already has the desired partitioning degree and, therefore, at this level Subplan A has a more favorable partitioning property than that of Subplan B because Subplan A has the degree of partitioning needed upstream in the plan. Subplan B does not yet have the desired property (partitioning degree of one), but it has the lower cost, so both Subplans are retained for further consideration (i.e., neither Subplan A nor Subplan B is pruned).

At step 1311, another Xchg operator is added to Subplan B above the grouping operation to merge the four streams (from the four Group By operators) back into a single stream. After doing so, at step 1312 the two Subplans are again compared to determine if one of them can be pruned. After adding the Xchg operator to Subplan B, the two Subplans now have the same partitioning degree (one). Assuming that there are no other differences and the useful properties provided by Subplan A and Subplan B are the same, the optimizer will select the Subplan that is cheaper and will prune the other Subplan. Assume that Subplan B (the parallel plan created by inserting the two Xchg nodes) is determined to be less expensive. If this is the case, then Subplan B will be retained for use in executing the query and Subplan A will be pruned as the partitioning property of the two is the same and Subplan A is more expensive. Note that in a case involving a more complex query, the above process of building alternative plans and subplans and comparing them may be repeated until the optimizer has determined a best plan or set of best plans for execution of the query. As previously described, with parallel plans the optimizer search engine may output a set of "best plans" to the parallel scheduler, as it may not be possible to determine a single "best plan" until after scheduling.

The optimizer uses a partitioning property during the search space inspection process as described above. It should be noted that, in its presently preferred embodiment, the optimizer also models both ordering and distinctness as properties. The optimizer considers these properties, as well as the partitioning property, during search space inspection. However, for clarity of presentation, these properties are not mentioned in the above example. Another item to note is that the optimizer precomputes the useful partitioning property across the entire query. At every level during the process of building the plan, the optimizer knows what partitioning property is useful. The optimizer then tries to enforce that partitioning by inserting Xchg operators that will generate partial plans that meet that useful partitioning target. Once that is done, the optimizer compares plans having the useful partitioning with other plans that do not have the useful partitioning as described above to determine which is more efficient (i.e., which one has more favorable execution costs). The costs and the useful properties are recalculated and re-evaluated at each level as plans are built in a bottom-up fashion. At each level, plans which are more expensive and which do not have "stronger" useful properties are pruned. Partial plans are retained if they are either cheaper than other plans or if they have useful properties which cheaper plans do not have.

"Any" and "Useless" Partitionings

In addition to hash, list, range and the other partitionings previously described, in its currently preferred embodiment, the optimizer also uses two additional types of partitionings for purposes of its internal operations. These two are referred to as "any" and "useless" partitionings. The following discussion will describe how they are used during optimization of an example query which includes a join of two tables. For purposes of this discussion, assume that the following query is received:

SELECT *
FROM A, B
WHERE A1=B1

Figure 14:
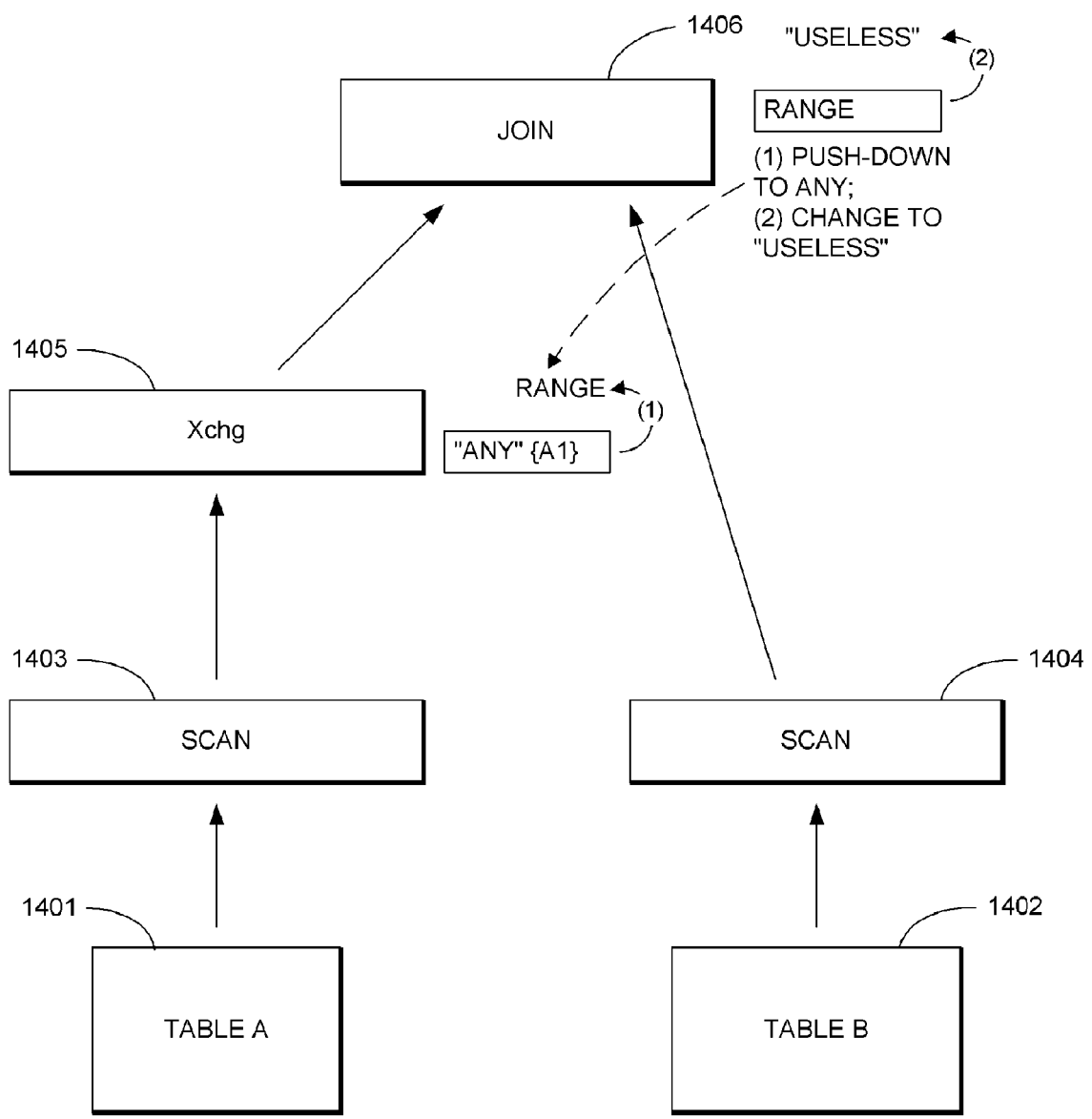
FIG. 14 is block diagram of an operator tree representing a plan that may be built for executing a query.

This query requests a join of data from two tables: table A and table B. Assume that table B has a range partitioning on column B1, while table A is unpartitioned. As previously described, the optimizer will try to find the best plan for executing the query by generating and evaluating partial plans in a bottom-up fashion. FIG. 14 is block diagram of an operator tree 1400 illustrating a plan involving an "any" partitioning for executing this query. As shown, at the bottom of the plan depicted at FIG. 14 is a Scan operator 1403 for scanning table A 1401. An Xchg operator 1405 is placed above the Scan operator for partitioning the data from table A. However, because the optimizer operates in a bottom-up fashion, at the time this partial plan for table A is built it is not yet known what partitioning would be useful as the specific partitioning of table B has not yet been seen. The optimizer does, however, know that column A1 needs to match B1 of table B. The present invention provides for a type of partitioning which is referred to as an "any" partitioning which can be used in this situation. The "any" partitioning property indicates that the partitioning at the Xchg operator 1405 will be performed on column A1, but the details of the partitioning are not yet known. In this case, these details will not be known until the join of table A and table B upstream in the plan at join node 1406. At the next level in the plan, the join operator 1406 joins the Scan node 1404 (which scans table B 1402) which has also been built in a bottom-up fashion. At the point that the partial plan covering table A is joined with the partial plan covering table B (which has a range partitioning), the "any" partitioning is changed to a range as indicated at (1) at FIG. 14. This range partitioning is, in essence, forced in a top-down fashion from the join node 1406 down to the Xchg node 1405 having the "any" partitioning.

The optimizer also includes support for a partitioning property which is referred to as a "useless" partitioning. For example, above the join operator 1406 in the operator tree shown at FIG. 14, there is no other operator that can actually use the range partitioning. Methodology of the present invention provides for converting this range partitioning to a "useless" partitioning at this point in the plan as indicated at (2) at FIG. 14 to indicate that the range partitioning is no longer useful upstream in the plan. The notion of the "useless" partitioning is that it makes the value of this partitioning property lower than the value of any other property for purposes of comparing plans/subplans. In other words, after the benefit of the partitioning has been obtained, the partitioning property value is adjusted to indicate that upstream (i.e., at higher levels of the plan being built in bottom-up fashion), the optimizer should not attribute value to this partitioning property. After the join has been completed, whatever value was provided by the partitioning has been obtained (and is reflected in the execution costs), so the optimizer essentially attributes no value to the partitioning property. This allows the optimizer to prune partial plans which are less efficient.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system comprising a database storing data in database tables, a method for improving query performance by dynamically partitioning said data, the method comprising:
   generating, by at least one processor, a plurality of subplans for obtaining data requested by the query, each subplan including one or more operators for performing relational operations;
   determining if partitioning of data is advantageous for performing a given relational operation, wherein said data includes unpartitioned data, and wherein determining if partitioning of data is advantageous for performing the given relational operation comprises determining whether an amount of data involved for the given relational operation satisfies a threshold;
   performing the given relational operation serially with at least some of said plurality of subplans if partitioning of data is determined to be not advantageous;
   adding operators for partitioning data and performing the given relational operation in parallel to at least some of said plurality of subplans if partitioning of data is determined to be advantageous;
   building a plan for execution of the query based, at least in part, upon selecting subplans having favorable execution costs; and
   executing the plan and returning results in response to the query.

2. The method of claim 1, wherein the query comprises a Structured Query Language (SQL) expression which includes at least one of a join, grouping, union, distinct, subquery and ordering operation.

3. The method of claim 1, wherein said adding step includes adding an operator to a subplan for splitting data into a plurality of partitions during processing of the query.

4. The method of claim 3, wherein said adding step includes cloning an operator for performing a given relational operation, so as to provide for performing the relational operation in parallel on said plurality of partitions.

5. The method of claim 3, wherein said plurality of partitions includes selected ones of data partitions and index partitions.

6. The method of claim 3, wherein said adding step includes determining partitions qualifying a predicate of the query.

7. The method of claim 6, further comprising:
   eliminating partitions not qualifying a predicate of the query, so as to avoid processing eliminated partitions.

8. The method of claim 7, wherein said step of determining partitions qualifying a predicate of the query includes determining whether a particular partition qualifies a given predicate based on partitioning keys of the particular partition.

9. The method of claim 1, wherein said adding step includes cloning an operator in a subplan into a plurality of operators for processing data in parallel.

10. The method of claim 1, wherein said adding step includes adding an operator for pipelining of intermediate results from a first operator to a second operator.

11. The method of claim 1, wherein said adding step includes adding an operator for performing a selected one of a range partitioning, a list partitioning, a hash partitioning, a round-robin partitioning, and an "any" partitioning.

12. The method of claim 1, wherein said building step includes selecting a subplan providing a partitioning which is advantageous to include the plan for execution of the query.

13. In a database system, a method for optimization of a query requesting data from a database, the method comprising:
   constructing, by at least one processor, a tree of relational operators based on the query, each relational operator for performing a given relational operation;
   determining whether partitioning of data processed by a particular relational operator in said tree is advantageous for executing a relational operation in parallel, wherein said data includes unpartitioned data, and wherein determining whether partitioning of data processed by a particular relational operator in said tree is advantageous for executing the relational operation in parallel comprises determining whether an amount of data involved for the given relational operation satisfies a threshold;
   if partitioning of data processed by a particular relational operation in said tree is determined to be not advantageous, executing the particular relational operation serially;
   if partitioning of data processed by a particular relational operator in said tree is determined to be advantageous, creating a revised tree by adding operators to said tree for dividing data processed by the particular relational operator and executing the particular relational operator in parallel over the divided data;

generating a plan for execution of the query based on said revised tree; and executing the plan and returning results in response to the query.

14. The method of claim 13, wherein the query comprises a Structured Query Language (SQL) expression which includes at least one of a join, grouping, union, distinct, subquery and ordering operation.

15. The method of claim 13, wherein said step of constructing a tree of relational operators includes generating nodes of the tree of relational operators as iterators for applying predefined behavior to data.

16. The method of claim 13, wherein said creating step includes creating a plurality of clones of the particular relational operator.

17. The method of claim 16, wherein said creating step includes inserting one or more operators into said tree for dividing data for processing in parallel by said plurality of clones.

18. The method of claim 17, wherein at least one of said one or more operators inserted into said tree implements a particular partitioning strategy.

19. The method of claim 18, wherein said particular partitioning strategy comprises a selected one of a range partitioning strategy, a list partitioning strategy, a hash partitioning strategy, a round-robin partitioning strategy, and an "any" partitioning strategy.

20. The method of claim 17, wherein said creating step further comprises inserting one or more operators into said tree for merging data after the data has been processed in parallel by said plurality of clones.

21. The method of claim 13, wherein said creating step is performed during generation of alternate plans for executing the query and said operators are added to at least some of said alternate plans.

22. The method of claim 21, wherein said step of generating alternate plans includes generating alternate subplans and said creating step includes adding operators for dividing data to at least some of said alternate subplans.

23. The method of claim 22, wherein said step of generating a plan for execution of the query includes selecting a particular subplan from a plurality of alternate subplans based, at least in part, upon whether the particular subplan has a division of data which is advantageous for purposes of query processing.

24. The method of claim 13, wherein said step of generating a plan for execution of the query includes determining data qualifying a predicate of the query.

25. A database system for dynamically partitioning data during query processing, the system comprising:
   a computer having memory and at least one processor for running the database system;
   a module operable to generate a plurality of plan fragments for obtaining data requested by a query from database tables of the database system; wherein at least some of the data is unpartitioned;
   a partitioning module operable to create additional plan fragments by adding operators for dynamically partitioning data and processing the partitioned data in parallel to at least some of said plan fragments;
   a module operable to determine whether dynamically partitioning data is advantageous, based on whether an amount of data involved for a plan fragment satisfies a threshold; and
   a module operable to construct a final plan for execution of the query based, at least in part, upon selecting plan fragments having operators for dynamically partitioning data and processing the partitioned data in parallel when dynamically partitioning data is determined to be advantageous and selecting plan fragments for processing the data serially when dynamically partitioning data is determined to be not advantageous.

26. The system of claim 25, wherein said module operable to generate groups said plan fragments into classes based on database tables covered by each plan fragment.

27. The system of claim 25, wherein said module operable to construct selects a given plan fragment from a given class based, at least in part, upon determining whether the given plan fragment has favorable execution costs.

28. The system of claim 25, wherein said module operable to generate generates plan fragments using iterators.

29. The system of claim 28, wherein a plan fragment comprises a tree of iterators for executing a portion of the query.

30. The system of claim 28, wherein said partitioning module creates an additional plan fragment by adding one or more iterators for partitioning data to a given plan fragment.

31. The system of claim 30, wherein said partitioning module creates the additional plan fragment by adding one or more iterators for executing a relational operation in parallel over the partitioned data to the given plan fragment.

32. The system of claim 25, wherein said module operable to construct prunes plan fragments having unfavorable execution costs and not providing a partitioning which is advantageous.

33. The system of claim 25, wherein said module operable to construct selects a particular plan fragment for inclusion in the final plan based on whether estimated execution costs of the particular plan fragment and whether the particular plan fragment provides a partitioning which is advantageous.

34. The system of claim 25, further comprising:
   an execution module operable to execute the query based on the final plan.

35. In a database system comprising a database storing data in database tables, a method for improving query performance comprising:
   receiving a query specifying a join of two or more database tables;
   as data is retrieved from the database during processing of the query,
      determining, by at least one processor, whether partitioning is advantageous for a given relational operation to be performed for returning data requested by the query based, at least in part, on determining whether a quantity of data to be processed during a given relational operation satisfies a threshold; and
   if partitioning is determined to be not advantageous, processing said query serially;
   if partitioning is determined to be advantageous, partitioning data to be processed during a given relational operation into separate memory; wherein at least some of the data is unpartitioned when retrieved from the database and before being partitioned into separate memory buffers;
   processing said query in parallel by concurrently processing said data in said memory buffers if partitioning is determined to be advantageous; and
   returning results of processing said query in response to said query.

36. The method of claim 35, wherein said partitioning step includes dividing the data into a plurality of data streams during processing of the query.

37. The method of claim 35, wherein said partitioning step includes determining data qualifying a predicate of the query.

38. The method of claim 37, further comprising:
processing only the data determined to qualify a predicate of the database query.

39. The method of claim 35, wherein said processing step includes cloning a relational operator to be used in processing the query into a plurality of relational operators for processing data in said memory buffers in parallel.

40. The method of claim 39, wherein said processing step includes merging results of said plurality of relational operators for returning results of the query.

41. The method of claim 35, wherein said partitioning step includes adding one or more operators to a plan for executing the query, said one or more operators for splitting data into a plurality of separate memory buffers for executing a given relational operation in parallel.

42. The method of claim 41, wherein said processing step includes cloning a given relational operator in the plan for performing the given relational operation in parallel on the plurality of separate memory buffers.

43. The method of claim 42, wherein said processing step further comprises adding an operator to the plan for merging data after the data has been processed in parallel.

44. A computer readable medium encoded with a computer program, the program comprising instructions that when executed by one or more processors cause the one or more processors to perform operations comprising:
generating a plurality of subplans for obtaining data requested by a query, each subplan including one or more operators for performing relational operations;
determining if partitioning of data is advantageous for performing a given relational operation, wherein said data includes unpartitioned data, and wherein determining if partitioning of data is advantageous for performing the given relational operation comprises determining whether an amount of data involved for the given relational operation satisfies a threshold;
performing the given relational operation serially with at least some of said plurality of subplans if partitioning of data is determined to be not advantageous;
adding operators for partitioning data and performing the given relational operation in parallel to at least some of said plurality of subplans if partitioning of data is determined to be advantageous;
building a plan for execution of the query based, at least in part, upon selecting subplans having favorable execution costs; and
executing the plan and returning results in response to the query.

45. A computer readable medium encoded with a computer program, the program comprising instructions that when executed by one or more processors cause the one or more processors to perform operations comprising:
constructing a tree of relational operators based on a query, each relational operator for performing a given relational operation;
determining whether partitioning of data processed by a particular relational operator in said tree is advantageous for executing a relational operation in parallel, wherein said data includes unpartitioned data, and wherein determining whether partitioning of data processed by a particular relational operator in said tree is advantageous for executing the relational operation in parallel comprises determining whether an amount of data involved for the given relational operation satisfies a threshold;
if partitioning of data processed by a particular relational operation in said tree is determined to be not advantageous, executing the particular relational operation serially;
if partitioning of data processed by a particular relational operator in said tree is determined to be advantageous, creating a revised tree by adding operators to said tree for dividing data processed by the particular relational operator and executing the particular relational operator in parallel over the divided data;
generating a plan for execution of the query based on said revised tree; and executing the plan and returning results in response to the query.

46. A computer readable medium encoded with a computer program, the program comprising instructions that when executed by one or more processors cause the one or more processors to perform operations comprising:
receiving a query specifying a join of two or more database tables;
as data is retrieved from the database during processing of the query,
determining whether partitioning is advantageous for a given relational operation to be performed for returning data requested by the query based, at least in part, on determining whether a quantity of data to be processed during a given relational operation satisfies a threshold; and
if partitioning is determined to be not advantageous, processing said query serially;
if partitioning is determined to be advantageous, partitioning data to be processed during a given relational operation into separate memory buffers; wherein at least some of the data is unpartitioned when retrieved from the database and before being partitioned into separate memory buffers;
processing said query in parallel by concurrently processing said data in said memory buffers if partitioning is determined to be advantageous; and
returning results of processing said query in response to said query.

* * * * *